US010809643B2

(12) United States Patent
Yuasa et al.

(10) Patent No.: US 10,809,643 B2
(45) Date of Patent: Oct. 20, 2020

(54) OPTICAL SCANNING DEVICE AND IMAGE FORMING DEVICE HAVING THE SAME

(71) Applicant: Konica Minolta, Inc., Tokyo (JP)

(72) Inventors: Takafumi Yuasa, Toyokawa (JP);
Hidenari Tachibe, Toyokawa (JP);
Masayuki Iijima, Okazaki (JP);
Makoto Obayashi, Toyokawa (JP);
Wataru Senoo, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/355,342

(22) Filed: Mar. 15, 2019

(65) Prior Publication Data
US 2019/0286006 A1   Sep. 19, 2019

(30) Foreign Application Priority Data
Mar. 16, 2018   (JP) .................................. 2018-049668

(51) Int. Cl.
G03G 15/043   (2006.01)
G02B 26/12   (2006.01)
G03G 15/04   (2006.01)
G02B 27/30   (2006.01)
G02B 27/09   (2006.01)

(52) U.S. Cl.
CPC ......... *G03G 15/043* (2013.01); *G02B 26/121* (2013.01); *G02B 27/0922* (2013.01); *G02B 27/0944* (2013.01); *G02B 27/30* (2013.01); *G03G 15/04036* (2013.01)

(58) Field of Classification Search
CPC . G03G 15/043; G03G 15/0436; G02B 26/121
See application file for complete search history.

(56) References Cited

U.S. PATENT DOCUMENTS

2010/0091083 A1* 4/2010 Itami ....................... B41J 2/471
347/261

FOREIGN PATENT DOCUMENTS

JP   2007-011113 A   1/2007
JP   2009-090524 A   4/2009
JP   2010-079170 A   4/2010

* cited by examiner

Primary Examiner — Walter L Lindsay, Jr.
Assistant Examiner — Andrew V Do
(74) Attorney, Agent, or Firm — Osha Liang LLP

(57) ABSTRACT

An optical scanning device that scans a photoreceptor with light, the device includes: a light emitter that emits light according to a supply current amount; a source-side optical system that includes an optical element corresponding to the light emitter, the optical element transmitting and shaping the light emitted from the corresponding light emitter; a polygon mirror that cyclically deflects the light shaped by the source-side optical system; an image-side optical system that condenses the light deflected by the polygon mirror on a surface of the photoreceptor; a motor that rotates the polygon mirror; and a light source controller that: monitors a temperature of the optical element; and adjusts the supply current amount for the light emitter or adjusts the temperature of the optical element corresponding to the light emitter to make a temperature difference between the light emitter and the corresponding optical element fall within an allowable range.

15 Claims, 9 Drawing Sheets

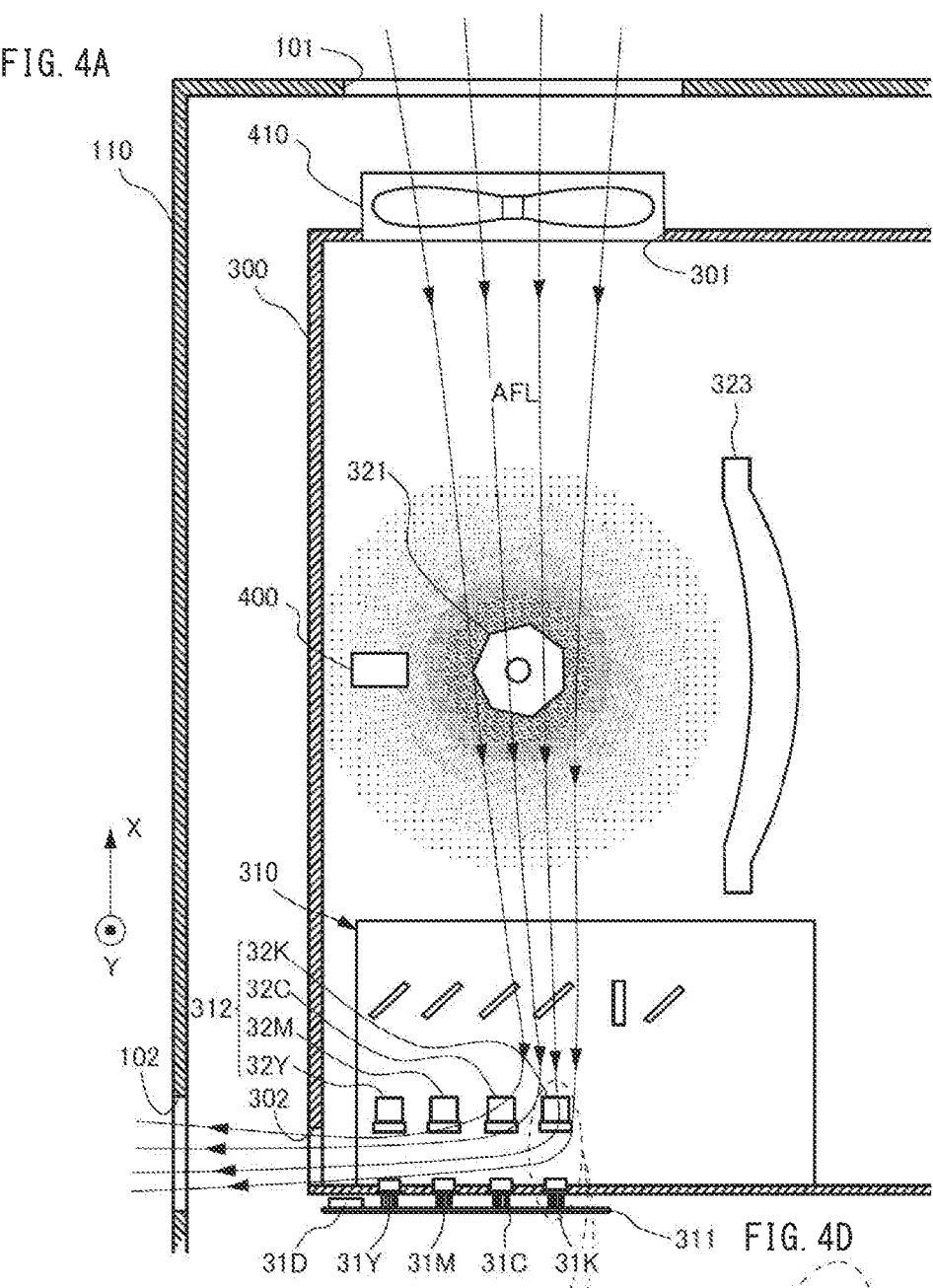
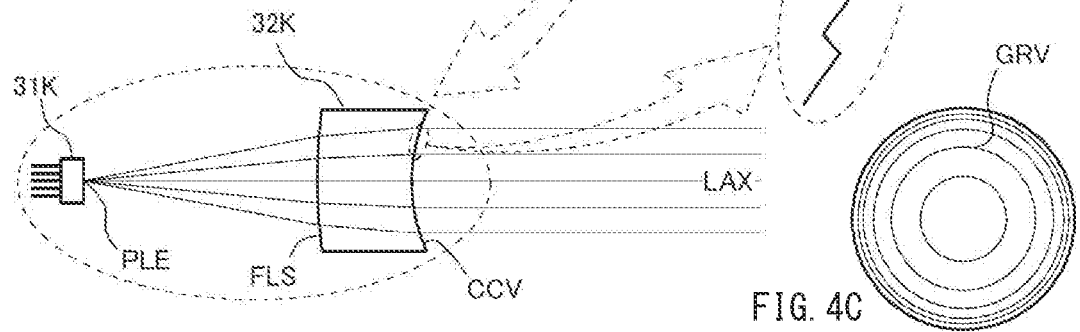

OPTICAL SCANNING DEVICE AND IMAGE FORMING DEVICE HAVING THE SAME

CROSS-REFERENCE TO RELATED APPLICATION

The entire disclosure of Japanese patent Application No. 2018-049668, filed on Mar. 16, 2018, is incorporated herein by reference in its entirety.

BACKGROUND

(1) Technical Field

The present invention relates to electrophotographic image forming arts, and in particular to control of light sources used for exposure of photoreceptors.

(2) Description of the Related Art

Electrophotographic image forming devices, such as printers and copiers, expose a charged area of a photoreceptor with light modulated by image data, so as to form an invisible image represented by a distribution of electrical charge amount according to light amount variation, i.e. an electrostatic latent image, on the photoreceptor. When toner migrates to the electrostatic latent image, a distribution of toner amount corresponds to the distribution of electrical charge amount, and thus the electrostatic latent image is converted to a visible toner image.

An optical scanning method is one of main operation principles used in devices which expose a photoreceptor to light. Such devices are also known as exposure devices and print heads (PHs). The optical scanning method cyclically deflects light emitted from light-emitting elements such as laser diodes (LDs) or light-emitting diodes (LEDs) with a polygon mirror, such that the light is condensed on the photoreceptor by an optical system such as an fθ lens. In each cycle of a deflecting action, a condensation point travels in a continuous movement on the photoreceptor in a single direction (hereinafter referred to as main scanning direction), so that the photoreceptor is exposed in a single straight line (hereinafter referred to as one line) along which the condensation point traveled. Connecting a plurality of lines in a perpendicular direction (hereinafter referred to as sub-scanning direction) extends the electrostatic latent image two-dimensionally.

Exposure devices typically each include a plurality of light-emitting elements. For example, a color printer forms single-color toner images for four or more toner colors such as yellow (Y), magenta (M), cyan (C), and black (K), by using the same number of light-emitting elements. Specifically, the single-color toner images are formed in parallel to one another and then overlapped on one another to compose a color toner image. Also, some monochrome devices are provided with exposure devices using the optical scanning method which uses multibeams for increased processing speed and resolution of an exposure process (hereinafter referred to as optical scanning devices). Such an optical scanning device emits light from light-emitting elements at the same time so as to expose lines on a surface of a photoreceptor at the same time.

When the optical scanning device uses the light-emitting elements in plurality as described above, optical characteristics such as light amount and wavelength must be uniform among the light-emitting elements in order to obtain a high image quality. The optical characteristics differ among the light-emitting elements depending on temperature difference thereamong in addition to individual difference. For this reason, the exposure device necessitates an art for controlling the temperature difference.

For example, Japanese Patent Application Publication No. 2009-090524 discloses a laser emitting device according to which every other laser source is selected out of four laser sources arranged in a row, for each deflection cycle of a polygon mirror as a subject to perform automatic power control for light amount stabilization (APC). The APC monitors the light amount of the laser source and controls an amount of electric current of the laser source to keep a difference between an actual measured value and a target value for the light amount within an allowable range. In each deflection cycle, the laser sources are alternately selected as the subject of the APC, so that heat amounts generated by the APC are leveled among the laser sources by the time adjacent laser sources are selected as subjects of APC in subsequent deflection cycles. Consequently, temperature differences among the laser sources are suppressed and thus a high level of reliability is maintained for the APC.

Japanese Patent Application Publication No. 2010-079170 discloses a multifunction peripheral (MFP) according to which a temperature difference among exposure light sources is monitored. When the temperature difference exceeds a threshold value, the MFP stops light emission from a light source having a higher temperature than other light sources in order to decrease the temperature of the light source. Consequently, the temperature difference among the light sources is suppressed to the threshold value or less.

Additionally, suppressing the temperature difference among the light-emitting elements is advantageous in maintaining excellent optical characteristics of optical system used in the exposure devices. This is because wavelengths of light emitted from the light-emitting elements have temperature dependence and the optical characteristics of optical elements have wavelength dependence. For example, wavelengths of light emitted from LDs elongate as a temperature rises, and accordingly position of beam waist comes close to the LDs. Such displacements cause the optical elements to go out of focus (defocus).

One known art for suppressing the defocus is for example the method disclosed in Japanese Patent Application Publication No. 2007-011113 according to which diffractive optical elements are used for a source-side optical system. The source-side optical system refers to an optical system including for example collimator lenses which shapes light emitted from light-emitting elements. The diffractive optical elements (DOEs) refer to optical elements which use diffraction to bend light.

DOEs are each typically provided with a diffraction grating on a surface of a transparent substrate made of glass or resin. The diffraction grating is made of refined grooves arranged on the surface of the substrate, in which light diffracted by the grooves interfere with each other so that intensity of the diffracted light is increased in a certain direction. The certain direction can be controlled by managing wavelengths of diffracted light and structures of the grooves, and thus the DOEs are capable of providing the optical characteristics almost the same as a refractive optical element which uses refraction to bend light.

Moreover, the DOEs are advantageous for reducing size and weight as the DOEs can be made thinner in an optical axis direction compared to the refractive optical elements. Further, the DOEs are advantageous for providing a desirable wavelength dependence to the optical characteristics with relative ease by making use of the wavelength dependence of diffraction.

The source-side optical system disclosed in Japanese Patent Application Publication No. 2007-011113 makes use of the advantage above to offset defocus, which is caused by temperature variation of a light source, by focal displacement, which is caused by refractive index variation of a DOE due to a temperature variation and a surface structure variation of the DOE due to thermal expansion. When the number of the light-emitting elements in the source-side optical system are two or more, the DOE having defocus offsetting effect is installed for each of the light-emitting elements.

Temperature difference between the DOEs typically has a negligibly small effect on a focus compared to temperature difference between the light-emitting elements. Therefore, as long as the temperature difference between the light-emitting elements is suppressed to a sufficiently small level, the DOEs each can offset the defocus at a similar level by a common surface structure.

In recent years, in an aim to further enhance productivity and image quality of image forming devices, ideas for increasing scanned area per unit time, i.e. data amount written per unit time, are being sought for optical scanning devices. An example of such ideas is to increase a rotation speed of a polygon mirror.

However, the increase of the rotation speed increases heat amounts generated by a motor rotating the polygon mirror (hereinafter referred to as polygon motor) and a driving circuit for the polygon motor. As optical scanning devices include an optical system housed in the same housing together with a polygon mirror and a polygon motor, an increase in heat amount generated by the polygon motor and the driving circuit may lead to a rise in temperature of the whole optical system.

Particularly in the case where a source-side optical system includes optical elements each having an effect of offsetting defocus caused by temperature variation of one of light-emitting elements corresponding to the optical element, a temperature difference can increase among the optical elements due to a position difference among the optical elements relative to the polygon mirror, the polygon motor, and/or the air passage.

When the temperature difference among the light-emitting elements excessively increases, simple reduction of the temperature difference might cause an excessive unevenness in defocus offsetting effect among the optical elements. If such an unevenness occurs, color misregistration might appear in toner images thereby to cause an excessive unevenness in toner density among lines. One method for avoiding such failures is to provide optical elements having different defocus offsetting effects such as DOEs having different surface structures for respective light-emitting elements. However, this method increases the number of necessary components and thus complicates a manufacturing process.

SUMMARY

One or more embodiments of the present invention aim to provide an optical scanning device capable of retaining excellent optical properties of a source-side optical system for all of light-emitting elements regardless of a temperature difference between optical elements included in the source-side optical system.

An optical scanning device according to one or more embodiments is an optical scanning device that scans a photoreceptor by light, the optical scanning device comprising: light-emitting elements that each emit a light amount according to a supply current amount; a source-side optical system that includes optical elements corresponding one-to-one to the light-emitting elements, the optical elements each being transmissive to the light emitted from a corresponding one of the light-emitting elements and shaping the light emitted from the corresponding light-emitting element; a polygon mirror that cyclically deflects the light shaped by the source-side optical system; an image-side optical system that condenses the light deflected by the polygon mirror on a surface of the photoreceptor; a motor that rotates the polygon mirror; and a light source controller that controls the supply current amount for each of the light-emitting elements. The light source controller includes: a temperature monitor that monitors respective temperatures of the optical elements, the temperatures varying due to heat transfer from at least one of the polygon mirror, the motor, and an air passage through which an external air flows to release heat from the polygon mirror and the motor; and a temperature difference adjuster that adjusts the supply current amount for each of the light-emitting elements or adjusts the temperature of one of the optical elements corresponding to the light-emitting element, such that a temperature difference between the light-emitting element and the corresponding optical element falls within an allowable range.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the invention.

In the drawings:

FIG. 4A is an enlarged view around a polygon mirror included in the optical scanning device in the top view in FIG. 2, FIG. 4B is an optical layout of a K-color semiconductor laser and its dedicated collimator lens in pairs in FIG. 4A, FIG. 4C is a plan view of the collimator lens seen from an image side according to one or more embodiments, and FIG. 4D is a partially enlarged view of an intersection of a cross section including an optical axis of the collimator lens and a concave lens surface according to one or more embodiments.

DETAILED DESCRIPTION OF EMBODIMENTS

Hereinafter, embodiments of the present invention will be described with reference to the drawings. However, the scope of the invention is not limited to the disclosed embodiments.

[Exterior of Image Forming Device]

Figure 1A:
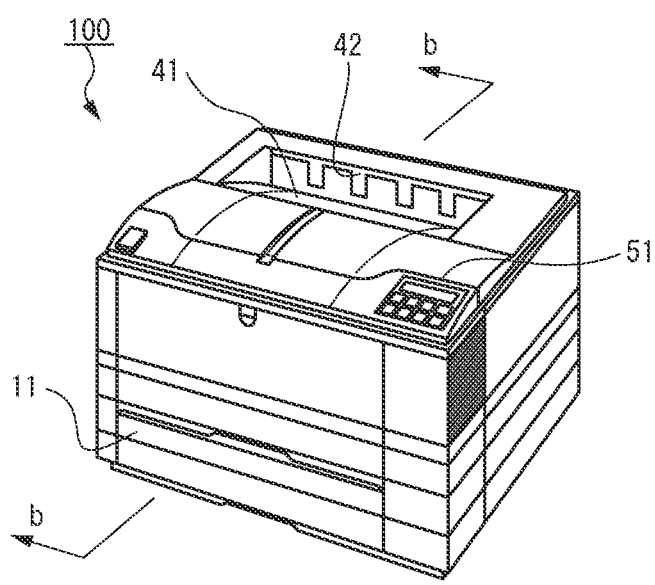
FIG. 1A is a perspective view of an exterior of a printer embodied by an image forming device according to one or more embodiments of the present invention.

FIG. 1A is a perspective view of an exterior of an image forming device 100 according to one or more embodiments of the present invention. The image forming device 100 is a printer having a housing with a top surface on which an ejection tray 41 is provided. The ejection tray 41 stores sheets ejected from an ejection slot 42 at a far side of the ejection tray 41. An operation panel 51 is embedded in the printer 100 in front of the ejection tray 41. A paper cassette 11 is attached in the bottom of the printer 100 so as to slide out like drawers.

[Interior Structure of Image Forming Device]

Figure 1B:
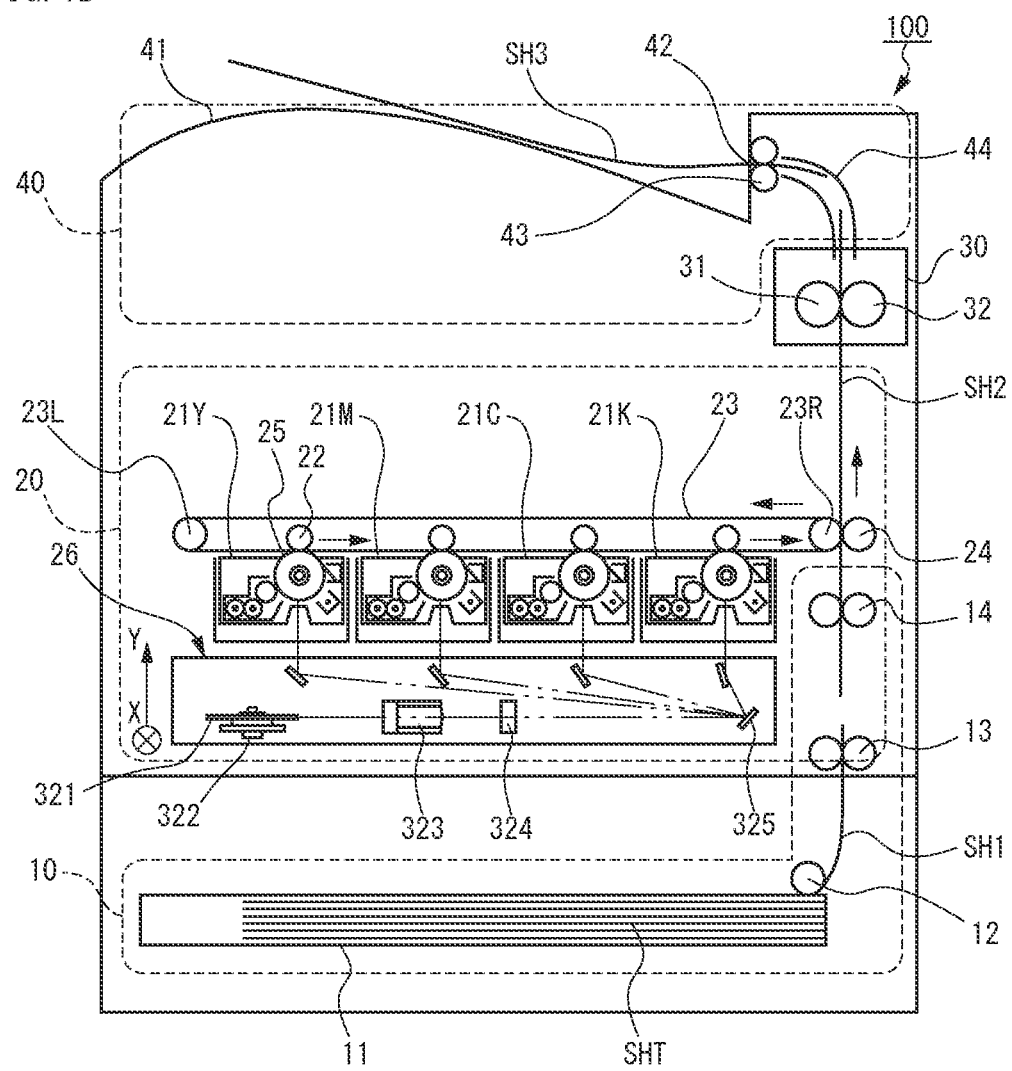
FIG. 1B is a schematic cross-sectional view of the printer along line b-b in FIG. 1A.

FIG. 1B is a schematic cross-sectional view of the printer 100 along line b-b in FIG. 1A. The printer 100 is a color printer of an electrophotographic type, which includes a sheet feeder 10, an image forming unit 20, a fixing unit 30, and an ejection unit 40.

First, the sheet feeder 10 separates sheets SH1 one by one from a stack of sheets SHT stored in the paper cassette 11 using a pickup roller 12. Then, the sheet feeder 10 picks up the separated sheet SH1 to the image forming unit 20 using conveyance rollers 13 and 14. The sheet in the present description refers to a thin film-shaped or thin plate-shaped material, product, or piece, which is made of paper or resin. Types of sheets storable in the paper cassette 11 include plain, high-quality, color-copier, or coated papers, and sizes of the sheets include standard sizes such as A3, A4, A5, and B4.

The image forming unit 20, for example, adopts an intermediate transfer system, which includes photoreceptor units 21Y, 21M, 21C, and 21K, primary transfer rollers 22, an intermediate transfer belt 23, a secondary transfer roller 24, and an optical scanning device 26. The intermediate transfer belt 23 extends around a driven pulley 23L and a driving pulley 23R, and is rotatable between the pulleys 23L and 23R following a rotation of the driving pulley 23R.

In a space between the pulleys 23L and 23R, the four photoreceptor units 21Y, 21M, 21C, and 21K and the four primary transfer rollers 22 are disposed in pairs, such that the photoreceptor unit and the primary transfer roller in pairs sandwich the intermediate transfer belt 23 therebetween (tandem arrangement). The secondary transfer roller 24 and the driving pulley 23R form a nip with the intermediate transfer belt 23 therebetween, and the secondary transfer roller 24 rotates following the rotation of the driving pulley 23R. A sheet SH2 picked up by the timing rollers 14 is fed through the nip.

Respective photoreceptor drums 25 of the photoreceptor units 21Y, 21M, 21C, and 21K, the primary transfer rollers 22, the intermediate transfer belt 23, the driven pulley 23L, the driving pulley 23R, and the secondary transfer roller 24 have rotation axes parallel to one another. Hereinafter, this common axial direction (Y axis direction in FIG. 1B) is referred to as main scanning direction. The optical scanning device 26 irradiates the photoreceptor units 21Y, 21M, 21C, and 21K with laser light for example one by one.

Respective light amounts, corresponding to intensity or duration, of the four laser light are modulated according to the tone values of the Y, M, C, and K colors reproduced by image data. The tone value of the color represented by the radiated light amount differs among the photoreceptor units 21Y, 21M, 21C, and 21K. Hereinafter, photoreceptor units of colors Y, M, C, K are referred to as Y-color, M-color, C-color, and K-color receptor units, respectively.

In each of the photoreceptor units 21Y, 21M, 21C, and 21K, the photoreceptor drum 25 is in contact with the primary roller 22 with the intermediate transfer belt 23 therebetween, so as to form a nip. The photoreceptor units 21Y, 21M, 21C, and 21K electrically charge the circumferential surfaces of the respective photoreceptor drums 25, and expose charged portions to the laser light radiated from the optical scanning device 26. The optical scanning device 26 condenses the radiated light on the circumferential surface of each of the photoreceptor drums 25 and moves a condensation point of the light in the axial direction (main scanning direction) of the photoreceptor drum 25, such that a linear region on the circumferential surface of the photoreceptor drum 25 is exposed along loci of the condensation point.

The larger a radiated light amount, i.e. the higher a radiated light intensity or the longer the radiated light duration, the larger an exposure amount per unit length in the main scanning direction, i.e. per dot. The larger the exposure amount, the greater a decrease in electrical charge amount per dot. As a result, the distribution of electrical charge amount, which corresponds to the distribution of tone values represented by variation in the radiated light amount, on the linear region of the photoreceptor drum 25. This is one line of the electrostatic latent image. Such an exposure operation for one line is repeated by the photoreceptor units 21Y, 21M, 21C, and 21K and the optical scanning device 26, in synchronization with rotation of the photoreceptor drums 25.

This results connection of exposed lines on the circumferential surfaces of the photoreceptor drums 25 in a rotation direction of the photoreceptor drums 25 (hereinafter referred to as sub-scanning direction), and thus the electrostatic latent images extend two-dimensionally. The respective photoreceptor units 21Y, 21M, 21C, and 21K of the Y, M, C, and K colors develop the electrostatic images using the toners in the Y, M, C, and K colors, respectively. This forms respective single-color toner images of the Y, M, C, and K colors on the photoreceptor drums 25 of the photoreceptor units 21Y, 21M, 21C, and 21K, respectively.

Then, while the intermediate transfer belt 23 rotates in a counterclockwise direction in FIG. 1B, the photoreceptor units 21Y, 21M, 21C, and 21K transfer the respective toner images onto the same surface part of the intermediate transfer belt 23 when the surface part passes through the nips between the primary transfer rollers 22 and the photoreceptor drums 25. The respective toner images of the Y, M, C, and K colors are thus overlapped onto the same surface part on the intermediate transfer belt 23 to compose one color toner image.

At the same time the color toner image passes through the nip between the driving pulley 23R and the secondary transfer roller 24, the sheet SH2 is fed through the nip from the timing rollers 14. Thus, the color toner image is transferred, at the nip, from the intermediate transfer belt 23 onto the sheet SH2.

The fixing unit 30 fixes the toner image onto the sheet SH2 conveyed from the image forming unit 20. Specifically, while the fixing unit 30 rotates a fixing roller 31 and a pressure roller 32, the sheet SH2 is fed through a nip formed between the fixing roller 31 and the pressure roller 32. Here, the fixing roller 31 applies heat to a surface of the sheet SH2 by an incorporated heater, and the pressure roller 32 applies pressure to the heated surface of the sheet SH2 to press the sheet SH2 onto the fixing roller 31.

Due to the heat from the fixing roller 31 and the pressure from the pressure roller 32, the toner image is thermally fixed onto the surface of the sheet SH2. The fixing unit 30 further rotates the fixing roller 31 and the pressure roller 32 to send the sheet SH2 to the ejection unit 40.

The ejection unit 40 ejects the sheet SH3, onto which the toner image is fused, from the ejection slot 42 to the ejection tray 41. Specifically, the ejection unit 40 rotates ejection rollers 43 provided inside the ejection slot 42 to eject the sheet SH3, which is sent from the top portion of the fixing unit 30 to the ejection slot 42, out of the ejection slot 42 such that the sheet SH3 is placed on the ejection tray 41.

[Structure of Optical Scanning Device]

Figure 2:
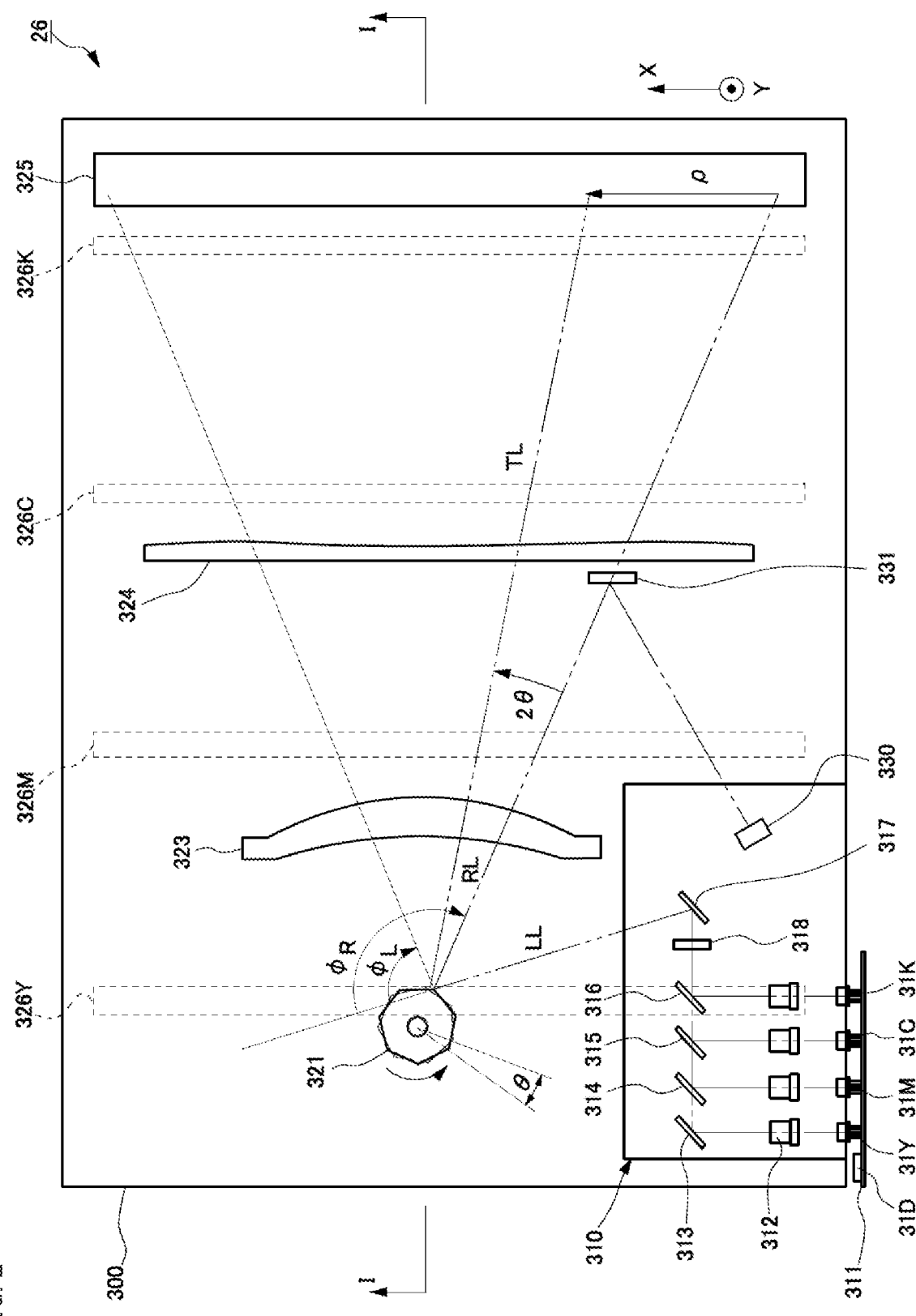
FIG. 2 is a top view of an optical scanning device in FIG. 1B.

FIG. 1B includes a longitudinal cross-sectional view of the optical scanning device 26. FIG. 2 is a top view of the optical scanning device 26. In FIG. 2, a top plate covering the optical scanning device 26 is removed for the sake of convenience for explanation, and a line I-I represents a longitudinal cross-section of the optical scanning device 26 in FIG. 1B. The optical scanning device 26 includes a housing 300, a light source 310, and a scanning optical system.

The housing 300 is for example a cuboid housing, and particularly has a high rigidity with a bottom plate which is a metal product made for example of die-cast aluminum or an object molded from hard resin such as fiber-reinforced plastic (FRP). The housing 300 is supported by a chassis (not illustrated) in the printer 100 such that short sides of the bottom plate are parallel to the common axial direction of the photoreceptor drums 25, that is, the main scanning direction (X axis direction in FIG. 1B and FIG. 2).

The housing 300 stably supports the light source 310 and the scanning optical system by the bottom plate. Also, the housing 300 isolates the light source 310 and the scanning optical system from a surrounding environment by the top plate and side walls so as to protect the light source 310 and the scanning optical system against dust and external light. The scanning optical system includes a polygon mirror 321, a driving motor 322 for the polygon mirror 321, and an image-side optical system. Hereinafter, the driving motor is referred to as polygon motor.

The image-side optical system includes fθ lenses 323 and 324, a primary steering mirror 325, and four secondary steering mirrors 326Y, 326M, 326C, and 326K. With use of these optical elements, the scanning optical system cyclically deflects light emitted from the light source 310, and condenses the light on the surfaces of the photoreceptor drums 25 thereby to scan the surfaces of the photoreceptor drums 25 by in the main scanning direction.

[Light Source]

The light source 310 includes a light-emitting substrate 311 and a source-side optical system. The light-emitting substrate 311 includes four semiconductor lasers 31Y, 31M, 31C, and 31K, and a driving circuit 31D for the semiconductor lasers. The source-side optical system includes four collimator lenses 312, five mirrors 313-317, and a cylindrical lens 318, and shapes light emitted from the semiconductor lasers 31Y, 31M, 31C, and 31K.

<Light-Emitting Substrate>

The light-emitting substrate 311 is a printed-circuit board attached to one of the side walls of the housing 300, for example, an outside surface of a side wall perpendicular to the main scanning direction (X axis direction) in FIG. 2. The semiconductor lasers 31Y, 31M, 31C, and 31K and the driving circuit 31D are mounted on the light-emitting substrate 311. The number of the semiconductor lasers to be mounted equals the number of the colors reproduced by image data, namely Y, M, C, and K.

The semiconductor lasers 31Y, 31M, 31C, and 31K are disposed on the side wall of the housing 300 at equal intervals and in parallel to each other, and have front edges that are inserted into the housing 300 through holes of the side wall of the housing 300. Though not illustrated in FIG. 2, the semiconductor lasers 31Y, 31M, 31C, and 31K have emission outlets with different heights (different positions in Y axis direction in FIG. 2), and accordingly emit beams with different heights.

The driving circuit 31D is an electronic circuit dedicated for drive control of the semiconductor lasers 31Y, 31M, 31C, and 31K, and is incorporated into a single or multiple chips as for example an application specification integrated circuit (ASIC) or a field programmable gate array (FPGA). The driving circuit 31D receives image data from a main controller built in the printer 100, and modulates light amounts emitted from the semiconductor lasers 31Y, 31M, 31C, and 31K based on the tone values of the Y, M, C, and K colors reproduced by the image data.

For example, the driving circuit 31D assigns the tone value of a different color to each of the semiconductor lasers. The driving circuit 31D assigns a higher emission intensity or a longer emission duration to the semiconductor laser having a higher assigned tone value. Hereinafter, the respective semiconductor lasers which have emitted light amounts modulated based on the tone values of the Y, M, C, and K colors are referred to as Y, M, C, and K semiconductor lasers.

<Source-Side Optical System>

The collimator lenses 312 are each arranged in front of the emission outlet of a corresponding one of the semiconductor lasers 31Y, 31M, 31C, and 31K, so as to have an optical axis that coincides with the outlet of the corresponding semiconductor laser. The collimator lenses 312 are refractive lenses or diffractive lenses made of glass or resin, which are each transmissive to light which can be emitted from a corresponding one of the semiconductor lasers 31Y, 31M, 31C, and 31K. The collimator lenses 312 each convert incident light from a corresponding one of the semiconductor lasers 31Y, 31M, 31C, and 31K to collimated light.

The first mirror 313 is arranged on an optical axis common to the Y-color semiconductor laser 31Y and its corresponding collimator lens 312, and reflects beams emitted from the Y-color semiconductor laser 31Y to deflect the beams. The second mirror 314 is arranged on an optical axis common to the M-color semiconductor laser 31M and its corresponding collimator lens 312, and reflects beams emitted from the M-color semiconductor laser 31M to deflect the beams.

The third mirror 315 is arranged on an optical axis common to the C-color semiconductor laser 31C and its corresponding collimator lens 312, and reflects beams emitted from the C-color semiconductor laser 31C to deflect the beams. The fourth mirror 316 is arranged on an optical axis common to the K-color semiconductor laser 31K and its corresponding collimator lens 312, and reflects beams emitted from the K-color semiconductor laser 31K to deflect the beams.

The cylindrical lens 318 transmits light deflected by the mirrors 313-316 to irradiate the fifth mirror 317 with the deflected light. The fifth mirror 317 reflects the radiated light to irradiate the polygon mirror 321 with the radiated light.

The cylindrical lens 318 is a refractive lens or a diffractive lens made of glass or resin, which is transmissive to light which can be emitted from the semiconductor lasers 31Y, 31M, 31C, and 31K. The cylindrical lens 318 condenses light collimated by the collimator lenses 312 on a side surface of the polygon mirror 321 in an axial direction (Y axis direction) of the polygon mirror 321, and the light collimated by the collimator lenses 212 is kept collimated in a direction perpendicular to both the Y axis direction and a light radiation direction.

[Scanning Optical System]
<Polygon Mirror>

The periphery of the polygon mirror 321 is a plated member that is a regular polygon (regular heptagon in FIG. 2). All side surfaces of the polygon mirror 321 are mirror-finished. The polygon mirror 321 is fixed coaxially to a shaft of the polygon motor 322 and rotates following the shaft to deflect an incident beam LL from the fifth mirror 317 at its side surfaces, and cyclically vary a deflection angle cp of the incident beam LL. Hereinafter, the side surfaces of the polygon mirror are referred to as deflecting surfaces.

The polygon motor 322 is for example a brushless direct-current (BLDC) motor whose shaft is fixed to the base plate of the housing 300 so as to be perpendicular to the base plate as in FIG. 1B. The polygon motor 322 receives electric current from a driver circuit (not illustrated) mounted on the bottom plate to exert torque around the shaft to the polygon mirror 321.

While the polygon mirror 321 rotates at a constant angular velocity with the torque exerted from the polygon motor 322, beams LL emitted from the fifth mirror 317, which have been emitted from the semiconductor lasers 31Y, 31M, 31C, and 31K, sequentially enter the deflecting surfaces as in FIG. 2. The incident beams LL are shaped by the source-side optical system 312-318 so that the beams are converged to a single point on the deflecting surface in the axial direction (Y axis direction) of the polygon mirror 321, and are kept as collimated light in the direction parallel to the bottom plate.

The incident beams LL are reflected by the deflecting surfaces to deflect toward the fθ lenses 323 and 324. Reflected beams RL diffuse from the single point on the deflecting surface in the axial direction (Y axis direction) of the polygon mirror 321, and remain as collimated light in the direction parallel to the bottom plate. While an inclination of the deflecting surface in relation to the incident beams LL continuously vary following the rotation of the polygon mirror 321, an angle formed between the incident beams LL and the reflected beams RL, i.e. a deflection angle φ, decreases continuously from a maximum value φR to a minimum value φL.

When the deflecting surface reflecting the incident beams LL switches to a next deflecting surface, the deflection angle φ instantaneously returns from the minimum value φL to the maximum value φR. Such variation of the deflection angle φ is repeated cyclically in synchronization with rotation of the polygon mirror 321.

<fθ Lens>

A fθ lens is typically a compound lens that includes aspherical lenses (two aspherical lenses in FIG. 2), namely, aspherical lenses 323 and 324. The aspherical lenses 323 and 324 are refractive lenses or diffractive lenses made of glass or resin, which is transmissive to light which can be emitted from the semiconductor lasers 31Y, 31M, 31C, and 31K. Beams RL reflected by the polygon mirror 321 transmit through the fθ lenses 323 and 324. The transmitted beams TL are reflected by the primary steering mirror 325 and the secondary steering mirrors 326Y, 326M, 326C, and 326K in this order, and then enter the photoreceptor units 21Y, 21M, 21C, and 21K so as to be condensed on the photoreceptor drums 25.

Here, the beams RL reflected by the polygon mirror 321 are diffused light in the axial direction (Y axis direction) of the polygon mirror 321, and are collimated light in the direction parallel to the bottom plate. The fθ lenses 323 and 324 thus has two types of optical functions as described below.

(1) When the fθ lenses 323 and 324 are regarded as a single refraction lens, a curvature of a lens surface differs between the axial direction (Y axis direction) of the polygon mirror 321 and a direction perpendicular to the axial direction.

(2) An image height (distance from optical axis to condensation point) is proportional to the incident angle (i.e. image height=focal distance×incident angle).

These functions allow a condensation point, when the beams TL transmitted through the fθ lenses 323 and 324 are condensed on the surfaces of the photoreceptor drums 25, to move in the axial direction of the photoreceptor drums 25, i.e. the main scanning direction (X axis direction) at a constant velocity following variation in the deflection angle φ at a constant velocity according to the rotation of the polygon mirror 321 at a constant velocity. In practice, a velocity of variation in the image height is the velocity of movement of the condensation point, and a velocity of variation in the incident angle is proportional to the velocity of the rotation of the polygon mirror 321.

Specifically, in FIG. 2, when the beam TL transmitted through the fθ lenses 323 and 324 travels a distance $\Delta\rho$ in the main scanning direction (X axis direction) on the primary steering mirror 325 while the deflection angle φ decreases by a variation amount $\Delta\varphi$ from the maximum φR, the distance $\Delta\rho$ is proportional to the variation amount $\Delta\varphi$ of the deflection angle φ: $\Delta\rho \propto \Delta\varphi$. The distance $\Delta\rho$ is proportional to a distance the condensation point travels on the surface of the photoreceptor drum 25, and the variation amount Δφ of the deflection angle φ is twice as large as a variation amount θ of the rotation angle of the polygon mirror 321: Δφ=2θ.

Accordingly, linearity is established between a position of the condensation point in the main scanning direction and the rotation angle of the polygon mirror 321. Specifically, when the polygon mirror 321 rotates at the constant angular velocity, the condensation point moves at the constant velocity in the main scanning direction while the deflection angle φ continuously decreases from the maximum φR to the minimum φL.

<Steering Mirrors>

The primary steering mirror 325 and the secondary steering mirrors 326Y, 326M, 326C, and 326K are elongated plate members having mirror-finished surfaces. As in FIG. 1B and FIG. 2, the steering mirrors 325, 326Y, 326M, 326C, and 326K are provided such that their longitudinal directions are parallel to a direction of the short sides of the bottom plate of the housing 300, i.e. the main scanning direction (X axis direction).

The primary steering mirror 325 reflects beams TL transmitted through the fθ lenses 323 and 324 toward a ceiling of the housing 300. The secondary steering mirrors 326Y, 326M, 326C, and 326K are disposed on the ceiling, and reflect the beams reflected by the primary steering mirror 325, so that the photoreceptor units 21Y, 21M, 21C, and 21K are irradiated with the reflected beams through a slit (not illustrated) of the top plate of the housing 300.

Particularly, the laser beams reflected by the primary steering mirror 325, which have been emitted from the Y-color semiconductor laser 31Y, are reflected by the first secondary steering mirror 326Y to radiate the Y-color photoreceptor unit 21Y. The laser beams reflected by the primary steering mirror 325, which have been emitted from the M-color semiconductor laser 31M, are reflected by the second secondary steering mirror 326M to radiate the M-color photoreceptor unit 21M.

Also, the laser beams reflected by the primary steering mirror 325, which have been emitted from the C-color semiconductor laser 31C, are reflected by the third secondary steering mirror 326C to radiate the C-color photoreceptor unit 21C. The laser beams reflected by the primary steering mirror 325, which have been emitted from the K-color semiconductor laser 31K, are reflected by the fourth secondary steering mirror 326K to radiate the K-color photoreceptor unit 21K.

Beams reflected by the primary steering mirror 325 radiate different destinations in this way according to difference in heights (position in the Y axis direction) of the emitted beams LL among the semiconductor lasers 31Y, 31M, 31C, and 31K. In practice, the source-side optical systems 312-318 make the emitted beams LL converge at the same position on the deflecting surface in the axial direction (Y axis direction) of the polygon mirror 321. That is, the incident angle of the emitted beams LL on the deflecting surfaces differ in the axial direction (Y axis direction) of the polygon mirror 321, among the semiconductor lasers 31Y, 31M, 31C, and 31K.

Accordingly, a diffusion range of the beams RL reflected by the polygon mirror 321 differs in the axial direction (Y axis direction) of the polygon mirror 321, among the semiconductor lasers 31Y, 31M, 31C, and 31K. Thus, the incident angle of the reflected beams RL on the fθ lenses 323 and 324 differs among the semiconductor lasers 31Y, 31M, 31C, and 31K.

Consequently, the incident angle of the beams TL transmitted through the fθ lenses 323 and 324 on the primary steering mirror 325, and the angle of reflection of the beams by the primary steering mirror 325 both differ in the axial direction (Y axis direction) of the polygon mirror 321, among the semiconductor lasers 31Y, 31M, 31C, and 31K. The difference in the reflection angle differentiates positions where the reflected light radiates in a longitudinal direction at the height of the top plate of the housing 300.

[Start of Scan (SOS) Sensor]

The light source 310 further includes a Start of Scan (SOS) sensor 330. The SOS sensor 330 includes a photo detector which detects light reflected by a mirror 331 and generates a notification signal (hereinafter referred to as SOS signal). The mirror 331 reflects beams reflected by the polygon mirror 321 at the maximum deflection angle φR, so that the SOS sensor 330 is irradiated with the beams.

Accordingly, the SOS sensor 330 activates an SOS signal each time the polygon mirror 321 reflects beams LL emitted from the light source 310 at the maximum deflection angle φR, such that the pulse rises when the SOS signal is a positive logic signal, and the pulse falls when the SOS signal is a negative logic signal.

Thus, an activation cycle of the SOS signal represents the laser beam deflection cycle of the polygon mirror 321, that is, a period in which the deflection angle φ varies once from the maximum value φR to the minimum value φL and back to the maximum value φR. The SOS signal is used in the image forming unit 20 to synchronize movements of not only the light source 310 but also movements of the whole photoreceptor units 21Y, 21M, 21C, and 21K with rotation of the polygon mirror 321.

[Semiconductor Lasers]

Figure 3A:
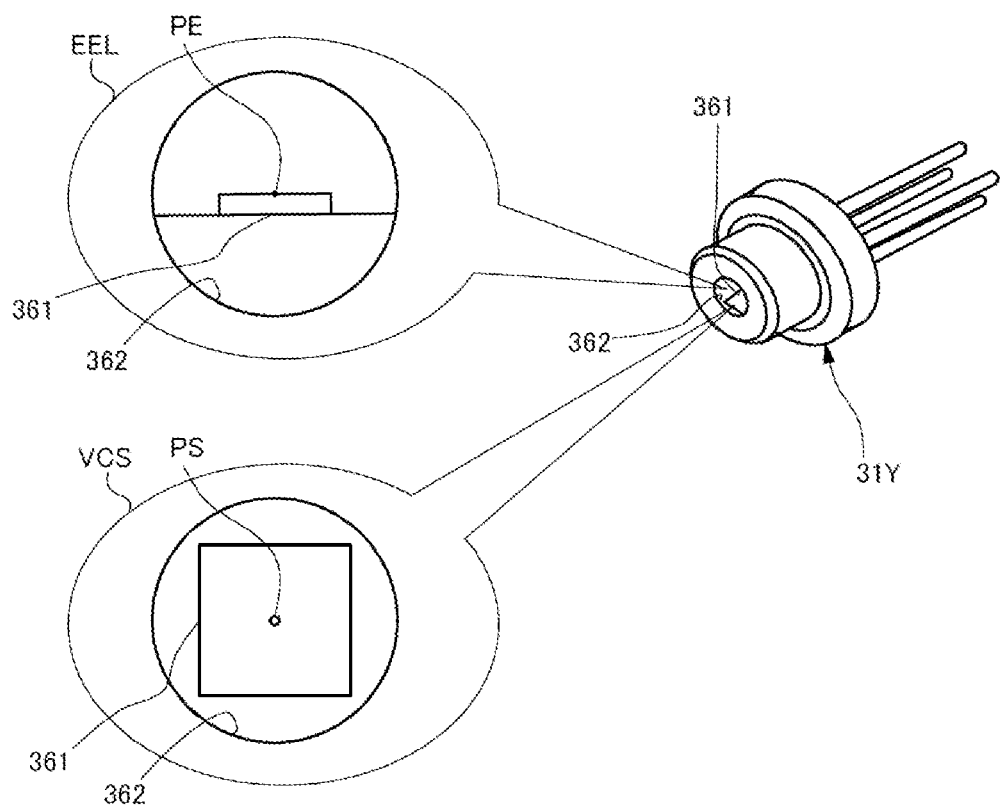
FIG. 3A is a schematic view of a package of a Y-color semiconductor laser according to one or more embodiments.

FIG. 3A is a schematic view of a package of the Y-color semiconductor laser 31Y. The semiconductor lasers 31M, 31C, and 31K have the same structure as that of the semiconductor laser 31Y. The Y-color semiconductor laser 31Y includes a laser oscillator 361. The laser oscillator 361 is for example an LD which is a semiconductor chip having a pn junction. The laser oscillator 361 can emit for example a laser light in a wavelength range from a visible range to an infrared range, i.e., from several hundred nanometers (nm) to a thousand and a several hundred nm at an energy output between several megawatts (mW) to tens of mW.

Light emission principles of the laser oscillator 361 is as follows. In an activation layer of the PN junction, light is emitted owing to recombination of holes and electrons, that is, owing to transition of the electrons from an excited state to a base state. This light emission process includes two types. One is spontaneous emission in which light is emitted according to spontaneous electron state transition. The other is stimulated emission in which light is emitted according to forced electron state transition by external light.

Light emitted from the activation layer by spontaneous emission is repeatedly reflected by two reflection mirrors facing each other across the pn junction, so that the emitted light travels back and forth within the activation layer and continuously induces the stimulated emission. When an electric current amount injected to the pn junction from outside is small and the number of electrons in the base state is larger than the number of electrons in the excited state, a light amount emitted from the activation layer mostly comes from spontaneous emission and a light amount that comes from stimulated emission is scarce.

When an injected current amount increases, a number ratio of the electrons in the excited state to the electrons in the base state increases accordingly. Then, when the injected current amount exceeds a certain threshold value (hereinafter referred to as threshold current) to reverse the ratio, the light amount by stimulated emission surpasses the light amount by spontaneous emission. This phenomenon is oscillation. Thus, the emitted light is amplified.

The laser oscillator 361 is classified into broadly two types. One is an edge emitting laser (EEL) which causes light to travel back and forth in a direction parallel to a surface of a chip. The other is a vertical-cavity surface-emitting laser (VCSEL) which causes light to travel back and forth in a direction vertical to a surface of a chip. Enlarged views EEL and VCS in FIG. 3A schematically illustrate an emission point PE of the laser oscillator 361 that is an EEL and an emission point PS of the laser oscillator 361 that is a VCSEL, respectively.

When the laser oscillator 361 is the edge emitting laser, as in the enlarged view EEL, its chip is arranged so that an edge of the chip shows from an emission outlet 362 of the package, and the edge includes the emission point PE. When the laser oscillator 361 is the VCSEL, as in the enlarged view VCSEL, the chip is arranged so the surface of the chip appears from the emission outlet 362 of the package, and the surface includes the emission point PS.

Figure 3B:
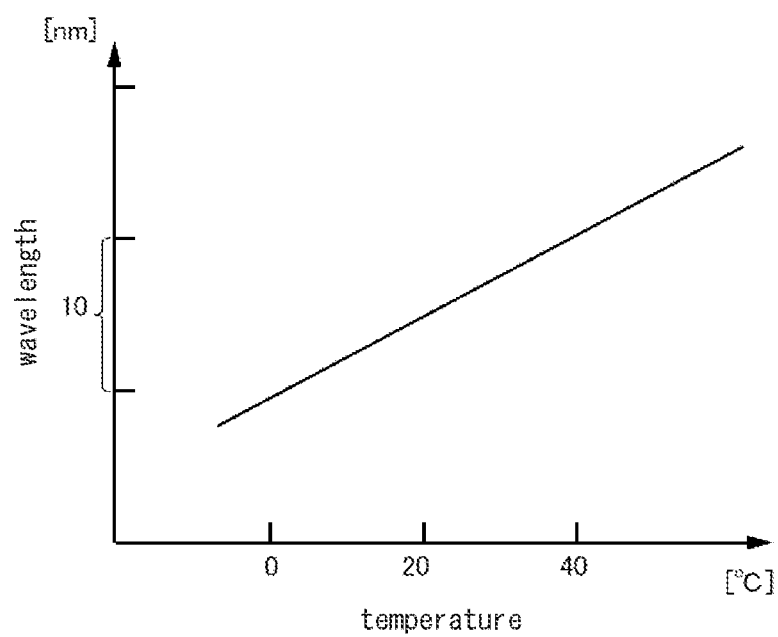
FIG. 3B illustrates a graph of temperature dependence of wavelength of light which the Y-color semiconductor laser is capable to emit according to one or more embodiments.

FIG. 3B illustrates a graph of temperature dependence of wavelength of light which the Y-color semiconductor laser 31Y is capable to emit. As in the graph, as the temperature increases, the wavelength of light emitted from the semiconductor laser typically moves for example toward long-wavelengths at a rate of a few hundredth nm per one degree Celsius. This is mainly because a refractive index of the semiconductor forming the pn junction increases according to the temperature increase.

[Heat Release Structure for Polygon Motor]

The light source 310 and the scanning optical system are accommodated in the housing 300 and are thus isolated from a surrounding environment. Therefore, heat from the polygon motor 322 and its driving circuit tends to accumulate in the housing 300. This heat causes an excessive deformation of the optical elements 312-318, 321, 323-325, and 326Y, 326M, 326C, and 326K in the source-side optical system and the scanning optical system, and thus causes an excessive relative displacement among the optical elements. In order to suppress such excessive deformation and relative displacement, the optical scanning device 26 further includes a heat release structure which releases heat from the polygon motor 322.

FIG. 4A is an enlarged view around the polygon mirror 321 included in the optical scanning device in the top view in FIG. 2. The heat release structure for the polygon motor 322 includes an air inlet 301 and an air outlet 302 on one of the side walls of the housing 300, and further includes a temperature sensor 400 and a fan 410.

As in FIG. 4A, the air inlet 301 is provided on the side wall of the housing 300 countering the side wall of the housing 300 on which the light-emitting substrate 311 is disposed and across the polygon mirror 321, and communicates with an air inlet 101 of a casing 110 of the printer 100 through a space of the chassis in the printer 100.

The air outlet 302 is provided on the side wall of the housing 300 extending in the main scanning direction (X axis direction) facing a side surface of the light-emitting substrate 311, and communicates with an outlet 102 of the casing 110 of the printer 100 through the space of the chassis in the printer 100.

The temperature sensor 400 is disposed in a vicinity of the polygon mirror 321, and for example between the polygon mirror 321 and the side wall of the housing 300 extending in the direction of the short sides of the bottom plate of the housing 300 in FIG. 4A, and includes a thermistor therein.

The thermistor varies an electrical resistance according to the temperature of the temperature sensor 400. Based on the electrical resistance, the temperature sensor 400 outputs an electrical signal at a level corresponding to the temperature thereof.

While the polygon mirror 321 rotates, heat diffuses from the polygon motor 322 and its driving circuit. Thus, as indicated by color gradation in FIG. 4A, a temperature distribution extends radially from the polygon mirror 321. In the temperature distribution, a peak heat level corresponds to the center position of the polygon mirror 321, that is, the position of the polygon motor 322. The shape of the temperature distribution is typically determined according to a peak value, that is, the temperature of the polygon motor 322. Thus, an actual temperature of the polygon motor 322 can be measured from the temperature of the temperature sensor 400 indicated by a signal output from the temperature sensor 400.

The fan 410 is for example a propeller fan, having a casing fit into the air inlet 301 of the housing 300, and having propellers rotated by a BLDC motor (not illustrated). This rotation causes air outside of the housing 300 to be sucked into the housing 300 through the air inlet 301. Then, external air flows into the housing 300 from the air inlet 101 of the casing 110 of the printer 100 through the fan 410.

As a result, an air flow AFL is generated in the housing 300, flowing from the air inlet 301 to the air outlet 302. The air flow AFL travels through the polygon mirror 321, the polygon motor 322, and the source-side optical system, specifically the four collimator lenses 312. By passing through these surroundings, the air flow AFL releases heat from the surroundings and carries the heat through the air outlet 302 of the housing 300, and then through the air outlet 102 of the casing 110 of the printer 100 to the outside of the casing 110.

Thus, the heat from the polygon mirror 321 and the polygon motor 322 is diffused to the external air through a passage of the air flow AFL, thereby to prevent overheat of the elements in the housing 300, particularly the optical system. The passage of the air flow AFL is hereinafter referred to as air passage.

[Collimator Lenses]

The optical elements 312-318 included in the source-side optical system, and the optical elements 321, 323-325, and 326Y, 326M, 326C, and 326K included in the scanning optical system are made of resin rather than glass in one or more embodiments. This is because the manufacturing cost of the optical elements can be more easily reduced when made of resin than glass. In practice, while glass optical elements require polishing to finish surfaces, resin optical elements simply require molding. Particularly, the collimator lenses 312 have lens surfaces that require highly precise processing or that have non-spherical and rather complicated shape. For this reason, the collimator lenses 312 are more processable when made of resin than glass.

Further, as in FIG. 3B, the wavelength of the light emitted from the semiconductor lasers 31Y, 31M, 31C, and 31K typically has temperature dependence. Thus, in order to suppress failures such as defocusing caused by the temperature dependence and the wavelength dependence of optical characteristics of the optical elements, the diffraction lenses are desirable for the collimator lenses 312 than the refraction lenses. This is because refractive index variations of the collimator lenses 312 due to temperature variations and surface structure variations due to a thermal expansion provide the focal with wavelength dependence by which the defocus caused by the temperature variation of the semiconductor lasers 31Y, 31M, 31C, and 31K can be offset (see Japanese Patent Application Publication No. 2007-011113 for example).

In this case, resin materials are advantageously used compared to glass materials in terms of processing complicated diffraction lens surfaces with a high precision at a low cost. This is because resin is high not only in processability but also in thermal expansion compared to glass, and thus the wavelength dependence of the focal due to the thermal expansion of the collimator lenses 312 can be used for easily offsetting wavelength variations of emitted light caused by the temperature variations of the semiconductor lasers 31Y, 31M, 31C, and 31K.

FIG. 4B is an optical layout of the K-color semiconductor laser 31K in FIG. 4A and its dedicated collimator lens 32K in pairs. The collimator lens 32K is a resin diffraction lens, and specifically a plano-concave lens. The same applies to the collimator lenses 32Y, 32M, and 32C which are respectively dedicated for the semiconductor lasers 31Y, 31M, and 31C of the Y, M, and C colors. Resin materials usable for the diffraction lenses include transparent thermosetting resin such as polycarbonate (PC), polymethyl methacrylate (PMMA), polystyrene (PS), and allyl diethylene glycol carbonate (ADC).

The collimator lens 32K has a flat lens surface FLS facing the K-color semiconductor laser 31K and has the optical axis LAX that coincides with the optical axis of the K-color semiconductor laser 31K. In this arrangement, a laser beam emitted from an emission point PLE of the K-color semiconductor laser 31K enters the flat lens surface FLS of the collimator lens 32K while diffusing centering around the optical axis LAS, passes through the collimator lens 32K, and is emitted from a concave lens surface CCV. The concave lens surface CCV is a transmission diffraction grating, specifically a blazed phase grating, which emits diffracted light only in a direction parallel to the optical axis LAX from any part of the surface. In other words, a laser beam parallel to the optical axis LAX is emitted from the concave lens surface CCV.

FIG. 4C is a plan view of the collimator lens 32K seen from an image side. FIG. 4D is a partially enlarged view of an intersection between a section including the optical axis LAX of the collimator lens 32K and the concave lens surface CCV. As in FIG. 4C, on the concave lens surface CCV has concentric circular grooves GRV around the optical axis LAX. As in FIG. 4D, a cross section including the optical axis LAX has a saw-toothed profile of the grooves GRV. The profile is hereinafter referred to as cross sectional shape. The concave lens surface CCV having such a microstructure of the grooves GRV functions as the blazed phase grating. The phase grating is a diffraction grating which cyclically varies a phase of transmitted light or reflected light.

The concave lens surface CCV cyclically varies the phase of the transmitted light in a radial direction by the concentric grooves GRV. Here, a distribution of the phase depends on the wavelength of the transmitted light and on the shape of the grooves GRV, and intensity of the diffracted light is determined by a phase difference between light interfering each other. Due to this, an intensity distribution of the diffracted light can be controlled by the shape of the grooves GRV. To blaze means to concentrate most of the energy of the diffracted light on particular wavelength and order by making a cross-sectional shape of the groove of the diffraction grating saw-toothed.

The saw-tooth cross section of the grooves GRV of the concave lens surface CCV is designed such that the energy of the diffracted light with respect to the wavelength of light emitted from the K-color semiconductor laser 31K focuses on the light diffracted in a diffraction order in the direction of the optical axis LAX of the collimator lens 32K, for example, the first-order diffracted light. In this design, respective variation patterns for an operation temperature of the K-color semiconductor laser 31K and a temperature of the collimator lens 32K over an operating period of the light source 310 are estimated relative to a standard operation temperature of the light source 310 such as 20 to 30 degrees Celsius.

Further, the material of the collimator lens 32K and the saw-tooth shape for the cross section of the grooves GRV are selected. This is in order to offset the defocusing of the collimator lens 32K, which is caused by the estimated temperature variation of the K-color semiconductor laser 31K, by a focal displacement of the collimator lens 32K, which is caused by both a variation in the refractive index caused by the estimated temperature variation of the collimator lens 32K and a variation in the saw-tooth shape caused by a thermal expansion. The selected material and saw-tooth shape are used for the collimator lenses 32Y, 32M, and 32C respectively corresponding to the semiconductor lasers 31Y, 31M, and 31C. This avoids, with regard to the source-side optical system, an increase in the number of necessary components and thus complication of the manufacturing process.

[Electronic Control System of Image Forming Device]

Figure 5:
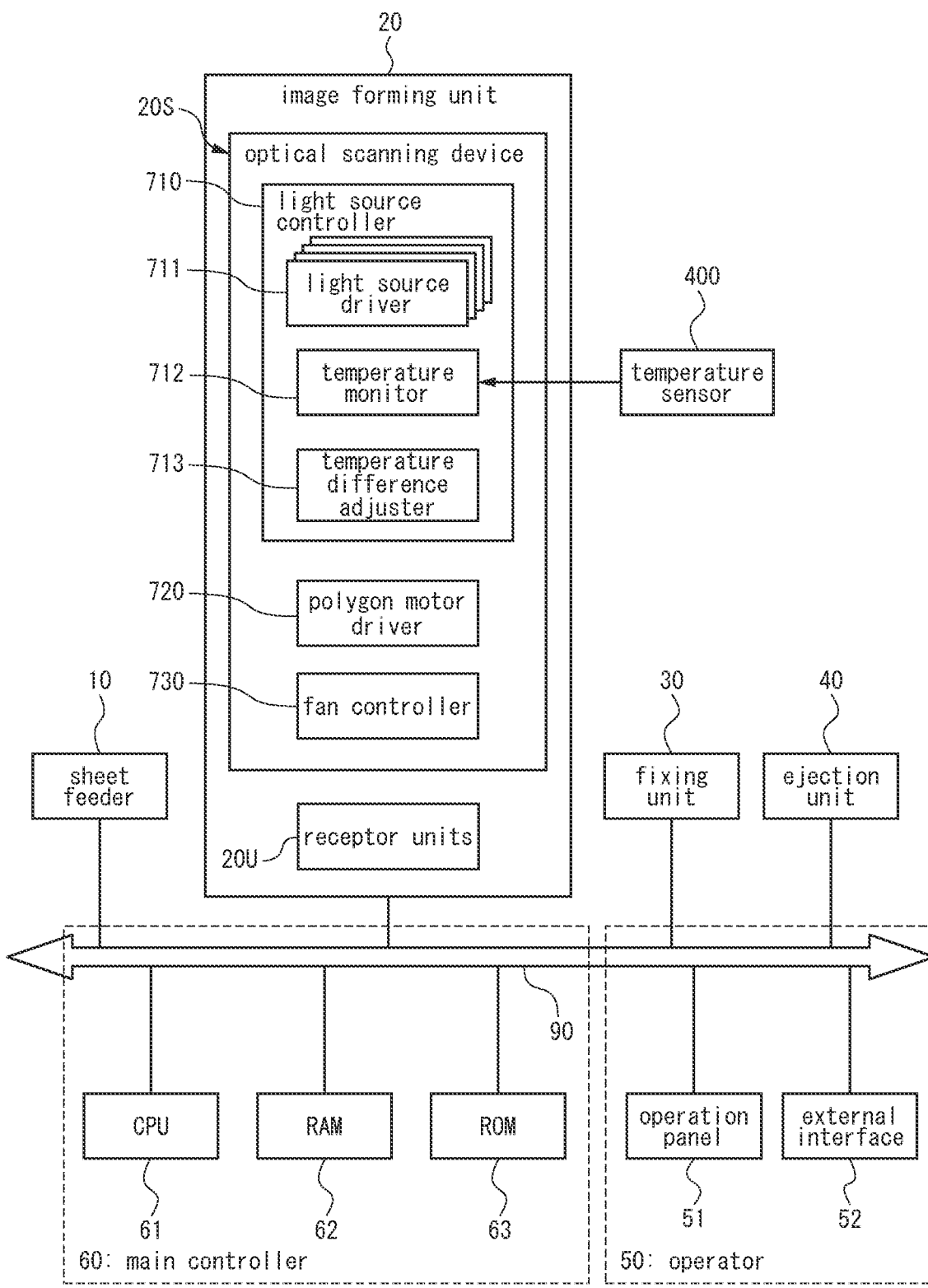
FIG. 5 is a block diagram illustrating a structure of an electric control system of the printer in FIG. 1A.

FIG. 5 is a block diagram illustrating the structure of an electric control system of the printer 100. In the electronic control system, the sheet feeder 10, the image forming unit 20, the fixing unit 30, an operator 50 and a main controller 60 are communicably connected to one another via a bus 90.

<Operator>

The operator 50 mounted on the printer 100 is the whole interface for users and external electronic devices, receives a job processing request and print target image data through a user operation or communication with an external electronic device, and transmits the request and the image data to the main controller 60. As in FIG. 5, the operator 50 includes an operation panel 51 and an external interface (I/F) 52.

As in FIG. 1A, the operation panel 51 includes push buttons, a touch panel, and a display. The operation panel 51 displays a graphic user interface (GUI) screen on the display. Moreover, the operation panel 51 identifies which button is pushed by a user among push-buttons, or detects which position on the touch panel is touched by a user, and transmits information on the identification or detection as operation information to the main controller 60.

Particularly when an input screen for print job is displayed on the display, the operation panel 51 receives information on printing conditions from a user such as sizes of a sheet to be printed, sheet types, positions (vertical or horizontal), the number of copies, and image qualities, and incorporates items that represent these conditions into the operation information.

The external I/F 52 includes a USB port or a memory card slot, through which the print target image data is fetched directly from an external storage device such as a USB memory or a hard disk drive (HDD). The external I/F 52 further includes a communication port that is connected to an external network in a wired or wireless manner, through which print target image data is received from other electronic device.

<Main Controller>

The main controller 60 is an integrated circuit mounted on a single printed circuit board set inside the printer 100. As in FIG. 5, the main controller 60 includes a CPU 61, a RAM 62, and a ROM 63. The CPU 61 consists of a microprocessor (micro processing unit (MPU)/central processing unit (CPU)) and executes various firmware.

The RAM 62 is a volatile semiconductor memory device such as a dynamic random-access memory (DRAM) and a static random-access memory (SRAM), which provides a work area for executing the firmware to the CPU 61 and stores print target image data received by the operator 50. The ROM 63 consists of a combination of a non-writable nonvolatile memory device and a rewritable nonvolatile memory device. The non-writable nonvolatile memory device includes a firmware. Meanwhile, the rewritable nonvolatile memory device includes an HDD or a semiconductor memory device such as an electrically erasable programmable read-only memory (EEPROM), a flash memory, or a solid state drive (SSD), and provides a storage area to the CPU 61 for storing environment variables and the like.

Through an execution of various firmware by the CPU 61, the main controller 60 controls other elements in the printer 100 based on the operation information received from the operator 50. Specifically, the main controller 60 controls the operator 50 to display an operation screen to receive a user operation. In response to this operation, the main controller 60 determines an operation mode such as a work mode, a standby mode, and a sleep mode, and then notifies the determined operation mode to other elements by a drive signal, so each element performs a process according to the operation mode.

For example, when the operator 50 receives a printing job from the user, the main controller 60 first controls the operator 50 to transfer print target image data to the RAM 62. Next, in accordance with printing conditions indicated by the printing job, the main controller 60 notifies the sheet feeder 10 of designation of a type of a sheet to be fed and a timing of feeding the sheet, provides the image data representing a toner image to be formed to the image forming unit 20, and notifies the fixing unit 30 of designation of a surface temperature of the fixing roller 31 to be maintained.

The main controller 60 selects target values for a sheet conveyance speed and a rotation speed of the polygon mirror 321 particularly according to image qualities, power consumptions, or one of sheet types and sheet thicknesses indicated by the printing conditions, and notifies the elements 10-40 of the printer 100 of the selected target values. For example, when the sheet type of the sheet to be printed is heavy paper, the sheet conveyance speed is set lower than plain paper. As a result, the power consumption of the driving motor 322 for the polygon mirror 321 is reduced while a power consumption of the driving motors for the conveyance rollers 12 and 13 and the like are stabilized irrespective of a basis weight of a conveyance target sheet.

<Control System of Image Forming Unit>

Not only the image forming unit 20 but also the sheet feeder 10, the fixing unit 30, and the ejection unit 40 include respective dedicated electrical control systems. The respective control systems included in the function units 10, 20, 30, and 40 control actuators, such as motors and solenoids, applying driving forces to movable members provided in the respective function units 10, 20, 30, and 40. The movable members include the conveyance rollers 12, 13, 14, 23R, 24, 31, 32, and 43 in FIG. 1B.

A control circuit for the actuator is an electric circuit such as an MPU/CPU, an ASIC, and a FPGA, which set a target value for an output (control value) of the actuator for designation to a driving circuit for the actuator. For example, a target value for an application voltage to a motor is designated based on an actual rotation speed fed back from the motor.

The driving circuit is a switching converter, which adjusts power supplied to the actuator by using as a switching element a power transistor such as a field effect transistor (FET) and an insulated gate bipolar transistor (IGBT), so as to maintain its output as a target value.

The control system of the image forming device 20 can roughly be divided into a system for the optical scanning device and a system for the photoreceptor units. The control system 20U for the photoreceptor units 21Y, 21M, 21C, and 21K controls actuators that drive the movable members such as the photoreceptor drums 25, similarly to actuators for the primary transfer roller 22, the driving pulley 23R of the intermediate transfer belt 23, and the second transfer roller 24. This maintains the rotation speed of the intermediate transfer belt 23 at a target value, and properly maintains timings of forming toner images of four colors on the surfaces of the photoreceptor drums 25, timings of transferring the toner images from the photoreceptor drums 25 to the intermediate transfer belt 23, and a timing of transferring the toner images to a sheet.

The control system 20S for the optical scanning device includes a light source controller 710, a polygon motor driver 720, and a fan controller 730. The light source controller 710 is the whole electric circuit system which controls electric current amounts of the semiconductor lasers 31Y, 31M, 31C, and 31K, including a light source driver 711, a temperature monitor 712, and a temperature difference adjuster 713. The light source driver 711 includes four dedicated circuits which individually control the respective electric current amounts of the semiconductor lasers 31Y, 31M, 31C, and 31K of the Y, M, C, and K colors, such that respective light amounts of the semiconductor lasers 31Y, 31M, 31C, and 31K vary to desired values. The four dedicated circuits are integrated into the driving circuit 31D mounted on the light-emitting substrate 311 (see FIG. 2).

The temperature monitor 712 monitors a temperature of the source-side optical system, particularly the collimator lens 312, through the temperature sensor 400 (see FIG. 4A). The temperature difference adjuster 713 adjusts the electric current amount for each of the respective semiconductor lasers 31Y, 31M, 31C, and 31K of the Y, M, C, and K colors based on the temperature of the collimator lens 312, so that a temperature difference between each of the semiconductor lasers 31Y, 31M, 31C, and 31K and a corresponding one of the collimator lenses 32Y, 32M, 32C, and 32K which transmits light received from the semiconductor laser falls within an allowable range.

The polygon motor driver 720 is the whole including a control circuit and the driving circuit for the polygon motor 322, which maintains the angular velocity of the polygon mirror 321 at a target value by controlling an electric power to be supplied to the polygon motor 322. The fan controller 730 is the whole including a control circuit and a driving circuit for a drive motor of the fan 410, which maintains a rotation speed of the fan 410 at a target value by controlling an electric power to be supplied to the motor.

[Light Source Driver]

Figure 6:
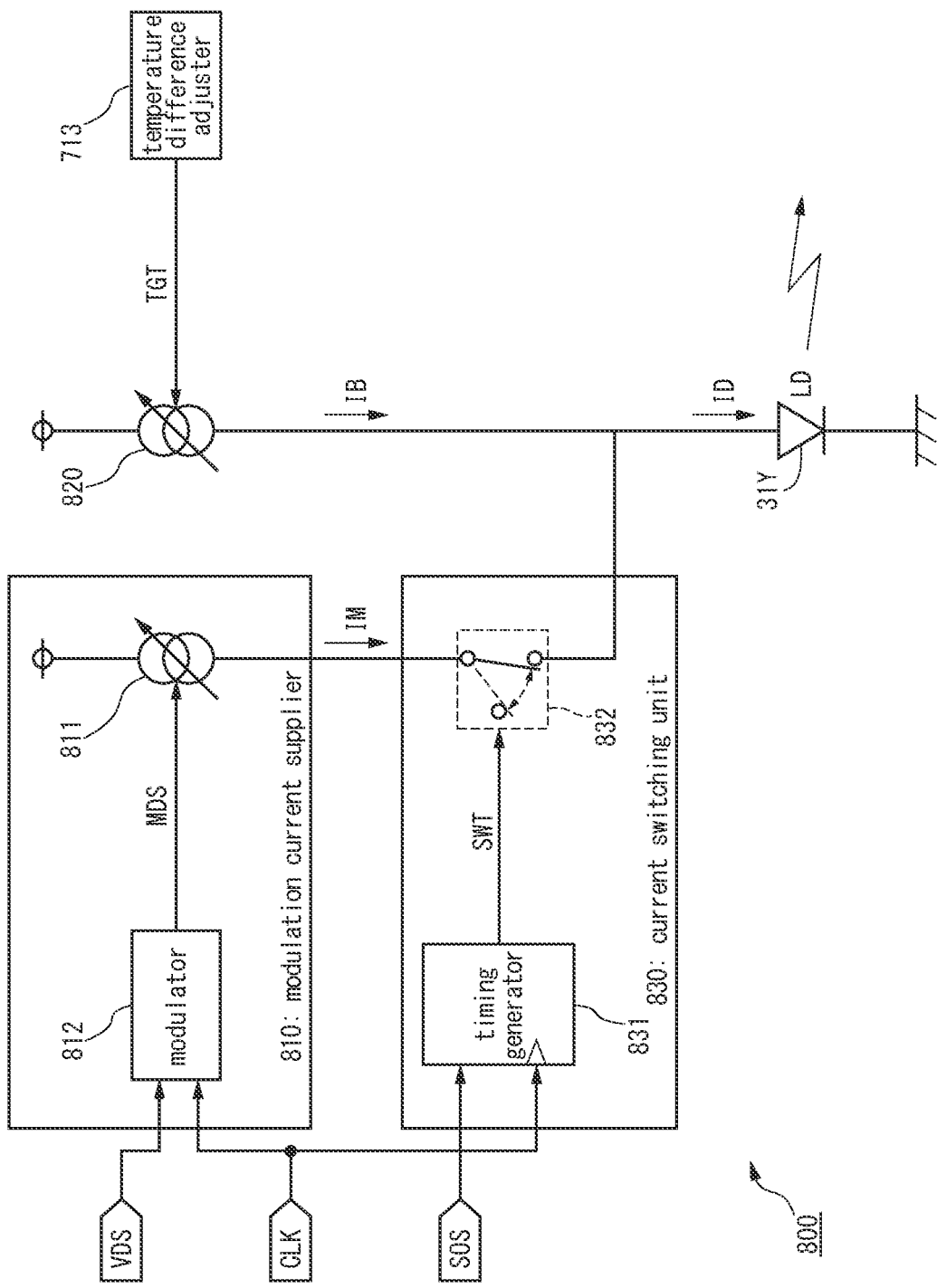
FIG. 6 is a block diagram illustrating a dedicated circuit for the Y-color semiconductor laser in a light source driver in FIG. 5.

FIG. 6 is a block diagram of a dedicated circuit 800 included in the light source driver 711 for the Y-color semiconductor laser 31Y. The dedicated circuit 800 includes a modulation current supplier 810, a bias current supplier 820, and a current switching unit 830. The dedicated circuit 800 uses these function units to provide a supply current ID to the Y-color semiconductor laser 31Y. Respective circuits dedicated for the semiconductor lasers 31M, 31C, and 31K have the similar structure.

<Modulation Current Supplier>

The modulation current supplier 810 supplies an electric current modulated according to image data to the Y-color semiconductor laser 31Y during a period in which the Y-color semiconductor laser 31Y should emit light, that is, during a light emission period. A range of this one line is determined by a printable range in a width direction of a sheet to be printed.

The modulation current supplier 810 includes a variable constant current source 811 and a modulator 812. The variable constant current source 811 is for example a switching power source that can perform a pulse amplitude modulation (PAM) control or a pulse width modulation (PWM) control on the output current. The variable constant current source 811 varies a height IMH or a width of an electric current pulse IM according to a modulation signal MDS transmitted from the modulator 812.

The height IMH of the pulse is set at a value sufficiently higher than a threshold current of the laser oscillator LD (for example several mill amperes (mA) to several tens of mA), for example at several hundred mA. The width of the pulse is set for example in the order from 0.1 nm to 1 nm. The modulator 812 is for example a circuit configured from an ASIC or an FPGA incorporated into a single chip or multiple chips.

The modulator 812 determines a height IMH or a width of an electric current pulse IM to be output by the variable constant current source 811 based on the Y-color tone value distribution in one line represented by image data VDS, and transmits the determined height IMH or width to the variable constant current source 811 by transmitting a modulation signal MDS. Further, the modulator 812 synchronizes the modulation signal MDS with a clock (CLK) signal.

The CLK signal is generated by a clock generator (not illustrated in FIG. 6) built in the electronic control system of the image forming unit 20 so that a frequency of the CLK signal is a constant value higher than the SOS signal transmitted from the SOS sensor 330, for example, a rectangular pulse signal kept accurately between several megahertz (MHz) to several tens of MHz. Particularly, a phase of the CLK signal is adjusted by a phase locked loop (PLL) so as to be synchronized with the SOS signal. Since the modulation signal MDS is synchronized with the CLK signal, a pulse waveform of the modulation current IM output from the variable constant current source 811 is also synchronized with the CLK signal.

<Bias Current Supplier>

The bias current supplier 820 continues to supply a bias current to a laser oscillator LD irrespective of whether the laser oscillator LD should emit light. While the bias current is supplied to the laser oscillator LD, the laser oscillator LD does not oscillate and thus does not substantially emit light.

In FIG. 6, the bias current supplier 820 is a variable constant current source, for example, a switching power source which can vary an amount of the bias current IB as an output current within a predetermined range. Specifically, the bias current supplier 820 maintains the amount of the bias current IB at a target value TGT selected from the predetermined range. The predetermined range is set within a range allowable for the bias current amount with regards to the laser oscillator LD, for example a range of several μA to several mA. The target value TGT is designated by the temperature difference adjuster 713. Since an output end of the bias current supplier 820 is directly connected to an anode of the laser oscillator LD, the bias current IB is continuously supplied to the laser oscillator LD during an operation of the bias current supplier 820.

<Current Switching Unit>

The current switching unit 830 switches the supply current ID for the laser oscillator LD of the Y-color semiconductor laser 31Y between the sum of the modulation current IM and the bias current IB and only the bias current IB, in accordance with whether the Y-color semiconductor laser 31Y is in its light emission period. Specifically, the current switching unit 830 includes a timing generator 831 and a switch 832.

The timing generator 831 is configured from an ASIC or an FPGA incorporated into a single chip or multiple chips, which generates a switch (SWT) signal based on an SOS signal and a CLK signal. Specifically, the timing generator 831 counts the number of rises of the CLK signal by a built-in counter, and rises the SWT signal when the counted number of rises reaches a predetermined value. Also, the timing generator 831 counts the number of falls of the CLK signal by the counter, and falls the SWT signal when the counted number of falls reaches the predetermined value.

The SWT signal is transmitted to the switch 832. In accordance with the rise of the SWT signal, the switch 832 connects between an output end of the variable constant current source 811 of the modulation current supplier 810 and the anode of the laser oscillator LD. Meanwhile, in accordance with the fall of the SWT signal, the switch 832 disconnects between the output end of the variable constant current source 811 and the anode of the laser oscillator LD. When the switch 832 establishes the connection, the laser oscillator LD is supplied with both the modulation current IM from the modulation current supplier 810 and the bias current IB from the bias current supplier 820. When the switch 832 breaks the connection, the laser oscillator LD is supplied with only the bias current IB.

[Timing of Supplying Electric Current to Semiconductor Laser]

Figure 7A:
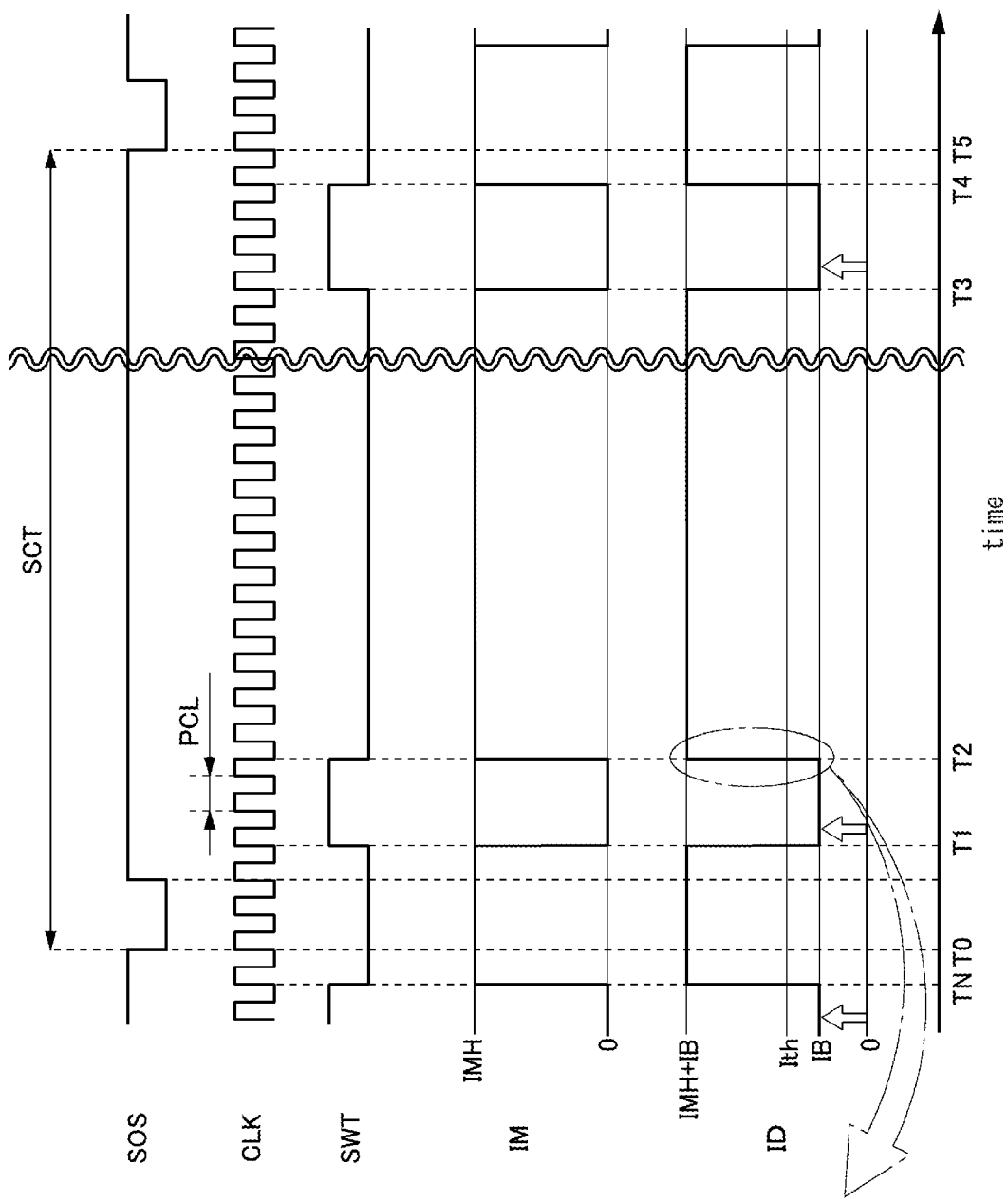
FIG. 7A is a timing chart of signals used by a timing generator in FIG. 6, namely, an SOS signal, a CLK signal, and an SWT signal, a modulation current IM, and a supply current ID of a laser oscillator LD.

FIG. 7A is a timing chart of signals used by a timing generator in FIG. 6, namely, an SOS signal, a CLK signal, and an SWT signal, the modulation current IM, and the supply current ID of the laser oscillator LD.

<Clk Signal>

The CLK signal is a signal that is output from a crystal oscillator or the like and is shaped into a rectangular pulse wave with a duty ratio of 50% at a cycle PCL of several tens of n seconds to several hundreds of n seconds (frequency of several MHz to several tens of MHz). A phase of the CLK signal is adjusted so that a rise of its pulse coincides with a fall of the SOS signal.

<Sos Signal>

The SOS signal is for example a rectangular pulse signal. Each time the deflection angle φ of the laser beam LL by the polygon mirror 321 reaches the maximum value φR, the SOS signal falls in response to detection of light reflected by the mirror 331 performed by the SOS sensor 330 and maintains a low level throughout the detection. Therefore, a fall interval SCT of the SOS signal, which is a period from a fall time point T0 to a next fall time point T5, represents a deflection cycle of the polygon mirror 321 for the laser beam LL, which is a period of several μ seconds to several tens of μ seconds in which the deflection angle φ varies once from the maximum value μR to the minimum value φL and back to the maximum value φR.

The timing generator 831 synchronizes a counting operation of pulses of the CLK signal by the built-in counter with the SOS signal. Specifically, the timing generator 831 resets a value of the counter to zero when the SOS signal falls. Then, the counter increments the value by 1 each time the CLK signal rises. Thus, the value of the counter indicates the number of times the CLK signal has risen since a starting point T0 of a current deflection cycle SCT of the polygon mirror 321, that is, an elapsed period corresponding to the number of elapsed cycles of the CLK signal.

<Swt Signal>

The SWT signal is for example a rectangular pulse signal. On and after a fall time point of the SOS signal, that is, on and after the starting point T0 of the deflection cycle SCT, a SWT signal level switches each time the number of rises of the CLK signal (hereinafter referred to as the number of clocks) indicated by the counter in the timing generator 831 reaches a predetermined value. A relationship between the number of clocks and the SWT signal level in FIG. 7A is as follows.

The number of clocks reaches the upper limit immediately before the fall time point T0 of the SOS signal. The upper limit is smaller than a value, which is obtained by converting a designed length of the deflection cycle SCT of the polygon mirror 321 for the laser beam LL into the number of clocks, by a predetermined margin, for example by one clock. Accordingly, a time point TN, at which the number of clocks reaches the upper limit, is earlier than a time point, at which the deflection angle φ of the laser beam LL by the polygon mirror 321 reaches the minimum value φL, by the predetermined margin.

When the number of clocks reaches the upper limit, the SWT signal accordingly falls and thus the switch 832 connects the modulation current supplier 810 to the laser oscillator LD, so that the modulation current IM rises from zero. In this way, the supply current ID of the laser oscillator LD rises from the bias current IB to switch to the summed current IM+IB of the modulation current IM and the bias current IB.

At the time point TN, the modulator 812 does not have image data VDS to be used for modulation, and thus a height or a width of the pulse of the modulation current IM is kept constant at a reference value. The summed current IM+IB of the modulation current IM and the bias current IB exceeds the threshold current Ith of the laser oscillator LD, and thus the laser oscillator LD emits light at a constant luminance.

Immediately thereafter, the deflection angle φ reaches the minimum value φL and then instantly returns to the maximum value φR. This makes the SOS sensor 330 detect light reflected by the mirror 331, and accordingly the SOS signal falls. Therefore, the number of clocks is reset to zero at the time point T0 at which the deflection angle φ returns to the maximum value φR, that is, at the starting point T0 of the deflection cycle SCT.

At a time point T1 when the number of clocks reaches a first set value three, the switch 832 breaks the connection between the modulation current supplier 810 and the laser oscillator LD, so that the modulation current IM falls to zero. In response to the fall, the supply current ID of the laser oscillator LD decreases to the bias current IB, specifically, falls below the threshold current Ith of the laser oscillator LD, so that the laser oscillator LD stops emitting light.

The first set value is for example a value of the number of clocks corresponding to a sum of a designed length of a period during which reflected beams RL reflected by the polygon mirror 321 traverse a light receiving surface of the SOS sensor 330 and a margin equal to or larger than an allowable error of the length of the period.

Thus, at the time point T1 where the number of clocks reaches the first set value, it is certain that the SOS sensor 330 has ended detecting any of the light reflected by the mirror 331 and the rise of the SOS signal has ended. Therefore, at the time point T1, when the switch 832 breaks the connection and stops the laser oscillator LD from emitting light, no error is given to the SOS signal.

At a time point T2 when the number of clocks reaches a second set value five, the SWT signal falls. The second set value is for example a value of the number of clocks corresponding to a time length from the starting point T0 of the deflection cycle SCT to the time point T2 at which a condensation point formed on the photoreceptor drum 25 by the scanning optical system reaches a front edge of one line to be written.

The second set value is typically dependent on a width of a sheet to be printed and a printing start position in a width direction. In response to the fall of the SWT signal, the switch 832 connects the modulation current supplier 810 to the laser oscillator LD, so that the modulation current IM rises from zero.

Thus, the supply current ID of the laser oscillator LD increases from the bias current IB to the summed current IM+IB of the modulation current IM and the bias current IB, so that the laser oscillator LD emits light. On and after the time point T2, the modulation current supplier 810 varies the pulse height IMH or the width of the modulation current IM according to image data. Then, as an amount of light emitted from the laser oscillator LD varies following the variation of the modulation current IM, one line of an electrostatic latent image is written onto the surface of the photoreceptor drum 25.

At a time point T3 when the number of clocks reaches a third set value, the SWT signal rises. The third set value is for example a value of the number of clocks corresponding to a time length from the starting point T0 of the deflection cycle SCT to the time point T3 at which the condensation point on the photoreceptor drum 25 reaches a rear edge of the one line to be written. The third set value is typically dependent on the width of the sheet to be printed and a printing end position in the width direction.

In response to the rise of the SWT signal, the switch 832 disconnects between the modulation current supplier 810 and the laser oscillator LD, so that the modulation current IM falls to zero. Thus, the supply current ID of the laser oscillator LD decreases to the bias current IB, specifically, falls below the threshold current Ith of the laser oscillator LD, so that the laser oscillator LD stops emitting light.

Then, at a time point T4 when the number of clocks reaches the upper limit, the SWT signal falls as the same as that of the preceding time point TN, so that the supply current ID of the laser oscillator LD increases from the bias current IB to the summed current IM+IB of the modulation current IM and the bias current IB. Since a height or a width of a pulse of the modulation current IM is constant, the laser oscillator LD emits light at a constant luminance. Immediately thereafter, the SOS sensor 330 detects the light reflected by the mirror 331, and accordingly the SOS signal falls. Therefore, at the fall time point T5, a next deflection cycle SCT starts and the number of clocks is reset to zero.

[Technical Significance of Bias Current]

Figure 7B:
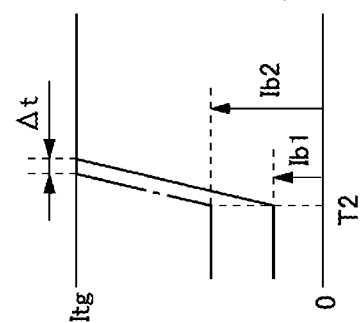
FIG. 7B is a view around a rise of the supply current ID of the laser oscillator LD in FIG. 7A, in an enlarged scale in a time direction.

FIG. 7B is a view around the rise of the supply current ID of the laser oscillator LD in FIG. 7A, in an enlarged scale in a time direction. As in the figure, in the case where the bias current amount at the time point T2 where the supply current ID starts to rise is a large value Ib2, the supply current ID reaches a target level Itg earlier by a time difference Δt than in the case where the bias current amount at the time point T2 is a small value Ib1 (Ib2>Ib1).

In this way, the larger the bias current amount, the earlier the rise of the supply current ID and thus the earlier the light emitted from the laser oscillator LD. Meanwhile, the larger the bias current amount, the larger an amount of power consumed by the laser oscillator LD while not emitting light. Therefore, the bias current amount is selected depending on a balance between a response speed of the laser oscillator LD and the power consumed by the laser oscillator LD while not emitting light.

[Temperature Monitor]

The temperature monitor 712 monitors temperatures of the source-side optical system, particularly the collimator lenses 312, using the temperature sensor 400 in FIG. 4A. Specifically, the temperature monitor 711 obtains an output signal from the temperature sensor 400 to estimate the temperature of the collimator lens 312 from a level of the output signal.

Data conversion in a form of numerical table or numerical formula is performed on a relationship between the level of the output signal of the temperature sensor 400 and an estimated value of the temperature of the collimator lens 312. Data of the relationship is stored in a nonvolatile memory device built in the temperature monitor 712. The temperature monitor 712 utilizes the data to retrieve the estimated value of the temperature of the collimator lens 312 corresponding to the level of the output signal of the temperature sensor 400 from the numerical table, or to calculate the estimated value according to the numerical formula.

The following describes a reason why the data conversion can be performed on the relationship between the level of the output signal of the temperature sensor 400 and the estimated value of the temperature of the collimator lens 312. The temperature of the temperature sensor 400 and the temperature of the collimator lens 312 correlated to each other. Specifically, the shape of the temperature distribution with the peak heat level at the position of the polygon motor 322 is determined practically according to the temperature of the polygon motor 322. Thus, the actual temperature of the polygon motor 322 can be measured from the temperature of the temperature sensor 400.

Meanwhile, as in FIG. 4A, the collimator lenses 312 are aligned at a downstream of the air passage AFL for the polygon mirror 321 and the polygon motor 322. While the fan 410 rotates, heat travels from the polygon motor 322 through the air passage AFL and raises temperatures of the collimator lenses 312. Amounts of temperature rise vary particularly among the collimator lenses 312. This is because a heat amount transferred from the polygon motor 322 differs according to the position relative to the polygon mirror 321, the polygon motor 322, and/or the air passage AFL for the polygon mirror 321 and the polygon motor 322.

In FIG. 4A, the amount of temperature rise is greater in the order of the collimator lenses 32K, 32C, 32M, and 32Y respectively corresponding to the K, C, M, and Y-color semiconductor lasers, since a greater heat amount is received in positions closer to an upstream of the air passage AFL.

Moreover, the higher the temperature of the polygon motor 322, the more the increase in the amounts of temperature rise of the collimator lenses 32Y, 32M, 32C, and 32K. Thus, the temperature of the temperature sensor 400 and the temperatures of the collimator lenses 312 correlate to each other. The correlation is measured by an experiment or a simulation and converted into data at a design stage of the device.

[Temperature Difference Adjuster]

The temperature difference adjuster 713 adjusts the electric current amount for each of the respective semiconductor lasers 31Y, 31M, 31C, and 31K of the Y, M, C, and K colors, so that the temperature difference between each of the semiconductor lasers 31Y, 31M, 31C, and 31K and a corresponding one of the collimator lenses 32Y, 32M, 32C, and 32K which transmits light received from the semiconductor laser falls within the allowable range. The adjustment is made due to the following reasons.

The collimator lenses 32Y, 32M, and 32C, which respectively correspond to the respective semiconductor lasers 31Y, 31M, and 31C of the Y, M, and C colors, also have the same structure as that of the collimator lens 32K corresponding to the K-color semiconductor laser 31K in FIGS. 4B-4D. This is because the collimator lenses 32Y, 32M, 32C, and 32K are designed based on a presupposition that no substantial difference exists among the respective semiconductor lasers 31Y, 31M, 31C, and 31K of the Y, M, C, and K colors in patterns of operation temperature variation over an operation duration of the light source 310, and no substantial difference accordingly exists in patterns of temperature variation among the collimator lenses 32Y, 32M, 32C, and 32K.

However, in practice, as in FIG. 4A, the collimator lenses 32Y, 32M, 32C and 32K differ from one another in position relative to the polygon mirror 321, the polygon motor 322, and/or the air passage AFL for the polygon mirror 321 and the polygon motor 322, and thus differ from one another in heat amount transferred from the polygon motor 322. Particularly in FIG. 4A, as greater heat amounts are received from the polygon motor 322 the more upstream the positions along the air passage AFL are, the temperature is higher in the order of the collimator lenses 32K, 32C, 32M, and 32Y respectively corresponding to the K, C, M, and Y-color semiconductor lasers.

When the temperature differences among the collimator lenses 32Y, 32M, 32C, and 32K are excessive, deviations from design conditions of these collimator lenses may exceed an allowable range. This causes a risk that the defocus caused by temperature variations of the semiconductor lasers 31Y, 31M, 31C, and 31K cannot be fully offset by focal displacement of the collimator lenses 32Y, 32M, 32C, and 32K. The focal displacement is caused by variation in refractive index, which is caused by temperature variation of the collimator lenses 32Y, 32M, 32C, and 32K, and variation in the saw-tooth shapes caused by thermal expansions of the collimator lenses 32Y, 32M, 32C, and 32K.

In order to maintain a defocus offsetting effect common to the collimator lenses 32Y, 32M, 32C, and 32K regardless of the temperature differences among the collimator lenses 32Y, 32M, 32C, and 32K, it is only necessary to maintain within the allowable range the temperature difference between each of the respective semiconductor lasers 31Y, 31M, 31C, and 31K of the Y, M, C, and K and a corresponding one of the collimator lenses 32Y, 32M, 32C, and 32K which transmits light received from the semiconductor laser.

This is because of the following reason. The temperature dependence of the wavelength of the light emitted from the semiconductor lasers 31Y, 31M, 31C, and 31K is linear as in FIG. 3B. The focal displacement due to the temperature variation of the collimator lenses 32Y, 32M, 32C, and 32K can also be regarded as being linear in a usage temperature range. Thus, as long as the temperature difference is constant between each of the semiconductor lasers and a corresponding one of the collimator lenses, the defocus offsetting effect can be regarded as not being dependent on absolute values of the temperatures of the collimator lenses.

The temperature difference adjuster 713 adjusts the temperature difference between each of the semiconductor lasers 31Y, 31M, 31C, and 31K and a corresponding one of the collimator lenses 32Y, 32M, 32C, and 32K, according to the operation temperature of the corresponding semiconductor laser. The operation temperatures of the semiconductor lasers 31Y, 31M, 31C, and 31K are determined by the Joule heat amount generated according to currents flowing the semiconductor lasers. The temperature difference adjuster 713 adjusts particularly the bias current amount for each of the semiconductor lasers 31Y, 31M, 31C, and 31K to control the Joule heat amount to be generated by the semiconductor laser.

The larger the bias current amount, the greater the Joule heat amount generated according to the bias current by the semiconductor laser while not emitting light. Therefore, the larger the temperature difference between the collimator lens and the semiconductor laser, the more the temperature difference adjuster 713 suppresses the bias current amount of the semiconductor laser so as to suppresses the Joule heat amount generated while no light is being emitted. As a result, the operation temperature of the semiconductor laser is lowered closer to the temperature of the collimator lens, such that the temperature difference therebetween is reduced.

Figure 8A:
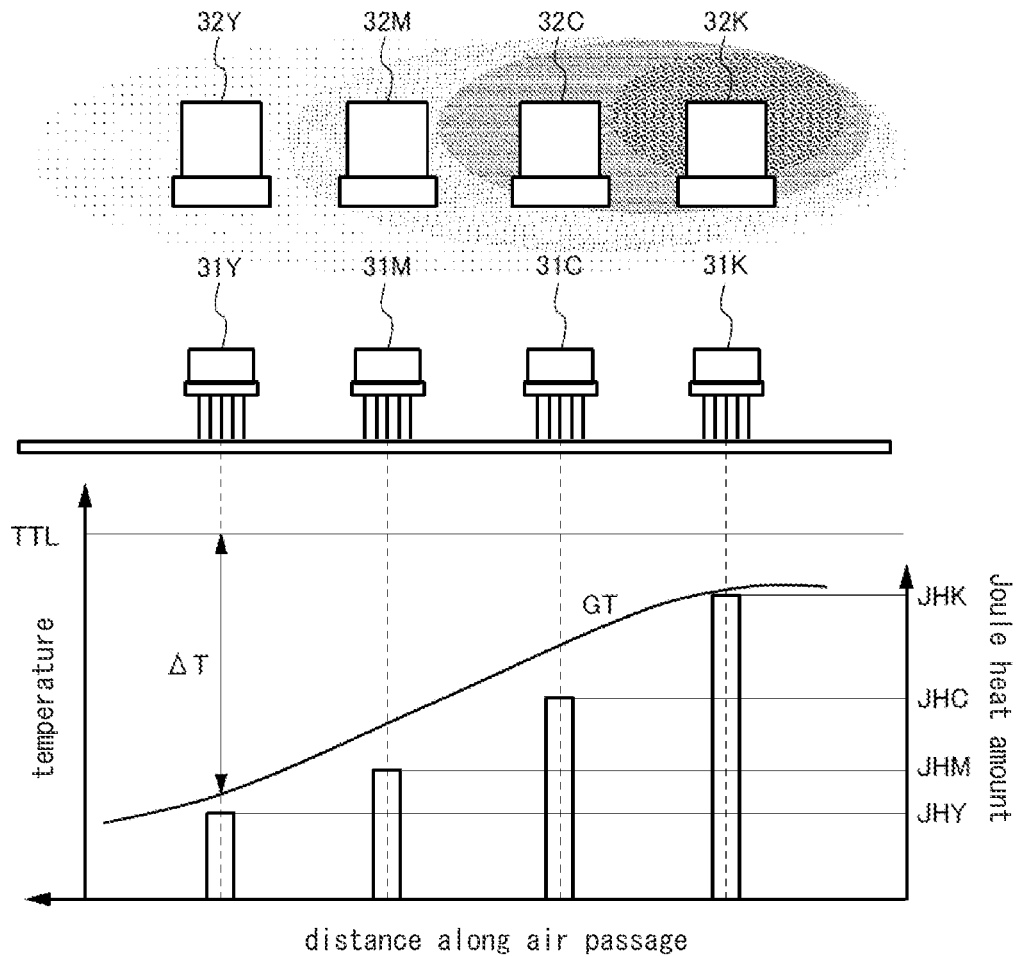
FIG. 8A illustrates a graphic curve GT representing a temperature gradient around the collimator lens in FIG. 4A and a bar graph representing Joule heat amounts to be generated according to bias currents by the semiconductor lasers so as to keep a temperature difference ΔT between each of the semiconductor lasers and the collimator lens within an allowable range.

FIG. 8A is a diagram of a graphic curve GT representing a temperature gradient around the collimator lenses 32Y, 32M, 32C, and 32K. Heat amounts transferred from the polygon motor 322 in positions along the air passage AFL increase the more upstream of the air passage AFL the positions are in. Hence, as the graphic curve GT represents, the more upstream of the air passage AFL the positions of the collimator lenses, the higher the temperatures of the collimator lenses (the temperature is higher where the gradation is darker in FIG. 8A).

Meanwhile, a typical operation temperature TTL of the semiconductor lasers is higher than the temperature represented by the graphic curve GT, and thus the temperature difference between the semiconductor laser and the collimator lens, that is, a distance $\Delta T$ from a straight line representing the operation temperature TTL to the graphic curve GT become smaller the more upstream of the air passage AFL the collimator lens is located.

The collimator lens 32K, which corresponds to the K-color semiconductor laser 31K at the most upstream position, is higher in temperature by several degrees Celsius than the collimator lens 32Y, which corresponds to the Y-color semiconductor laser 31Y at the most downstream position. Thus, the collimator lens 32K, which is at the most upstream position, is lower in temperature difference $\Delta T$ from the corresponding collimator lens than the collimator lens 32Y, which is at the most downstream position, by several degrees Celsius.

This difference in temperature difference $\Delta T$ between the respective collimator lenses at the most upstream position and the most downstream position from the semiconductor lasers typically exceeds the allowable range according to which the defocus offsetting effect can be obtained by the collimator lenses 32Y, 32M, 32C, and 32K. Thus, the defocus offset effect decreases for the collimator lens at either the most upstream or the most downstream position. This makes the toner images on the surfaces of the photoreceptor drums 25 go out of position, and thus color misregistration might occur in the color toner image transferred onto the sheet.

In an aim to avoid this risk, the temperature difference adjuster 713 sets the respective bias current amounts for the semiconductor lasers 31Y, 31M, 31C, and 31K as described below. First, the temperature difference adjuster 713 obtains the temperature difference $\Delta T$ between each of the collimator lenses 32Y, 32M, 32C, and 32K and the typical operation temperature TTL of a corresponding one of the semiconductor lasers based on the temperature of the collimator lens estimated by the temperature monitor 712 (the temperature represented by the graphic curve GT in FIG. 8A).

Next, the temperature difference adjuster 713 obtains a variation amount of the operation temperature of each of the semiconductor lasers 31Y, 31M, 31C, and 31K that allows the temperature difference $\Delta T$ to be maintained within the allowable range, and calculates a necessary Joule heat amount for temperature variation that is to be generated according to the bias current.

FIG. 8A further illustrates a bar graph representing the Joule heat amount to be generated according to the bias current by each of the semiconductor lasers 31Y, 31M, 31C, and 31K so as to maintain the temperature difference $\Delta T$ between the semiconductor laser and a corresponding one of the collimator lenses within the allowable range.

The temperature difference $\Delta T$ from the collimator lens is larger in the order of the respective semiconductor lasers 31Y, 31M, 31C, and 31K of the Y, M, C, and K colors. Therefore, the Joule heat amount to be generated according to the bias current should be smaller in the order of values JHY, JHM, JHC, and JHK, which respectively correspond to the respective semiconductor lasers 31Y, 31M, 31C, and 31K of the Y, M, C, and K colors.

Figure 8B:
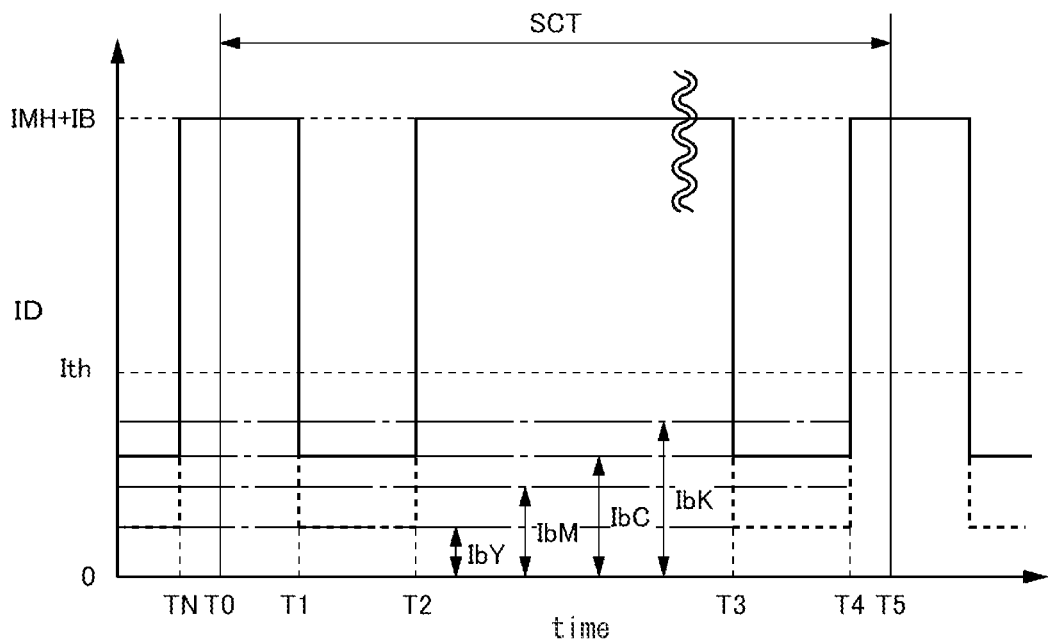
FIG. 8B is a waveform chart of the supply current ID of the laser oscillator LD during a laser beam deflection cycle of the polygon mirror according to one or more embodiments.

FIG. 8B is a waveform chart of the supply current ID of the semiconductor lasers during the laser beam deflection cycle of the polygon mirror 321. As described earlier with reference to FIG. 7A, at the starting point T0 of the deflection cycle, the supply current ID is already being maintained at a value exceeding the threshold current Ith, so that the SOS sensor 330 can detect the light reflected by the polygon mirror 321, and the semiconductor is emitting light.

At the time point T1 where the number of clocks reaches the first set value, the switch 832 breaks the connection between the modulation current supplier 810 and the laser oscillator LD, so that the supply current ID falls below the threshold current Ith and thus the semiconductor laser stops emitting light. At the time point T2 where the number of clocks reaches the second set value, the condensation point on the photoreceptor drum 25 reaches the front edge of one line to be written, so that the supply current ID exceeds the threshold current Ith and thus the semiconductor laser emits light.

At the time point T3 where the number of clocks reaches the third set value, the condensation point on the photoreceptor drum 25 reaches the rear edge of the one line to be written, so that the supply current ID falls below the threshold current Ith and thus the semiconductor laser stops emitting light. At the time point T4 where the number of clocks reaches the upper limit, since it is immediately before the deflection angle φ of the laser beam LL by the polygon mirror 321 returns from the minimum value φL to the maximum value φR, the supply current ID exceeds the threshold current Ith and thus the semiconductor laser emits light.

As such, the bias current IB is supplied to the semiconductor lasers during periods excluding the light emission periods T0-T1, T2-T3, and T4-T5 in each of the deflection cycles. That is, the bias current IB is supplied during the following two periods in each of the deflection cycles: a period from the time point T1, where the reflected beam RL reflected by the polygon mirror 321 has totally finished crossing a light receiving surface of the SOS sensor 330, to the time point T2, where the beam reaches the front edge of the one line to be written; and a period from the time point T3, where the condensation point on the photoreceptor drum 25 reaches the rear edge of the line to be written, to the time point T4, which is immediately before return of the deflection angle φ of the laser beam LL by the polygon mirror 321 from the minimum value φL to the maximum value φR.

Thus, the bias current is supplied to the semiconductor lasers 31Y, 31M, 31C, and 31K during the same period. Further, the Joule heat amount generated according to the bias current is equal to a product of the bias current amount and its duration. Accordingly, in order to differentiate the amount of temperature rise caused by the Joule heat amount among the semiconductor lasers 31Y, 31M, 31C, and 31K, it is necessary to differentiate the bias current amount among the semiconductor lasers 31Y, 31M, 31C, and 31K.

Therefore, targets values for the bias current amounts are set smaller in the order of values IbY, IbM, IbC, and IbK, which respectively correspond to the respective semiconductor lasers 31Y, 31M, 31C, and 31K of the Y, M, C, and K colors.

In FIG. 8B, the Joule heat amount is proportional to an area between an electric current waveform and a time axis, and the area becomes smaller as the target value for the bias current amount becomes smaller. In other words, the waveform in FIG. 8B indicates that the smaller the target value for the bias current for the semiconductor laser, the smaller the Joule heat amount generated according to the bias current.

The target values IbY, IbM, IbC, and IbK for the bias current amount are each determined for the temperature difference between the semiconductor laser and the collimator lens through experiments or simulations during a manufacturing process of the optical scanning device 26. The determined target values IbY, IbM, IbC, and IbK are stored in a nonvolatile memory element built in the temperature difference adjuster 713 in a table form so as to respectively correspond to respective identifiers of the semiconductor lasers 31Y, 31M, 31C, and 31K and the respective temperature differences from the collimator lenses 32Y, 32M, 32C, and 32K.

The temperature difference adjuster 713 obtains the temperature difference between each of the semiconductor lasers 31Y, 31M, 31C, and 31K and a corresponding one of the collimator lenses 32Y, 32M, 32C, and 32K according to the temperature of the collimator lens estimated by the temperature monitor 712. Then, the temperature difference adjuster 713 retrieves the bias current amount corresponding to the temperature difference from the correspondence table, or calculates the target value according to the numerical formula, and then sets the obtained target value for the bias current supplier 820.

As the temperature of each of the semiconductor lasers 31Y, 31M, 31C, and 31K are adjusted by the Joule heat amount increased or decreased according to the bias current amount in this way, the temperature difference between each of the semiconductor lasers 31Y, 31M, 31C, and 31K and a corresponding one of the collimator lenses 32Y, 32M, 32C, and 32K is maintained within the allowable range.

Advantages of One or More Embodiments

In the optical scanning device 26 according to one or more embodiments, as described above, the temperature monitor 712 monitors the temperature rises of the source-side optical system, particularly the collimator lenses 32Y, 32M, 32C, and 32K, which are caused by heat transfer from the polygon mirror 321, the polygon motor 322, and/or the air passage AFL. The temperature difference adjuster 713 obtains through this monitor the temperature difference between each of the semiconductor lasers 31Y, 31M, 31C, and 31K and a corresponding one of the collimator lenses 32Y, 32M, 32C, and 32K. Then, the temperature difference adjuster 713 adjusts the respective target values IbY, IbM, IbC, and IbK for the bias current amounts of the semiconductor lasers 31Y, 31M, 31C, and 31K, according to the obtained temperature differences.

These target values IbY, IbM, IbC, and IbK are determined by experiments or simulations so as to satisfy the following conditions. The collimator lenses 312 differ from one another in position relative to the polygon mirror 321, the polygon motor 322, and/or the air passage AFL, and thus differ from one another in amount of temperature rise caused by heat transfer from the polygon motor 322.

Meanwhile, in the case where the semiconductor lasers 31Y, 31M, 31C, and 31K are regarded as having an equal value of the typical operation temperature, the differences in amounts of temperature rise among the collimator lenses 32Y, 32M, 32C, and 32K can simply be regarded as the respective temperature differences from the semiconductor lasers 31Y, 31M, 31C, and 31K. As long as the temperature differences fall within the allowable range defined under the design conditions of the collimator lenses 32Y, 32M, 32C, and 32K, it is possible to offset the defocus, which is caused by temperature variations of the semiconductor lasers 31Y, 31M, 31C, and 31K, by focal displacement of the collimator lenses 32Y, 32M, 32C, and 32K, which is caused by variation in refractive index caused by the temperature variations of the collimator lenses 32Y, 32M, 32C, and 32K and variation in saw-tooth shape caused by thermal expansions of the collimator lenses 32Y, 32M, 32C, and 32K.

Meanwhile, the operation temperatures of the semiconductor lasers 31Y, 31M, 31C, and 31K can be adjusted to be lower as the bias current amounts decrease. Therefore, the target values IbY, IbM, IbC, and IbK are determined so that the larger the temperature difference between the semiconductor laser and the collimator lens, the smaller the bias current amount and thus the smaller the operation temperature of the semiconductor laser.

The temperature difference adjuster 713 obtains the temperature difference between each of the semiconductor lasers 31Y, 31M, 31C, and 31K and a corresponding one of the collimator lenses 32Y, 32M, 32C, and 32K according to the temperature of the collimator lens estimated by the temperature monitor 712. Then, the temperature difference adjuster 713 retrieves the target values IbY, IbM, IbC, and IbK for the bias current amounts corresponding to the respective temperature differences from the correspondence table, or calculates the target values according to the numerical formula. Since the temperatures of the semiconductor lasers 31Y, 31M, 31C, and 31K are adjusted according to the target values IbY, IbM, IbC, and IbK, the temperature difference between each of the semiconductor lasers 31Y, 31M, 31C, and 31K and a corresponding one of the semiconductor lasers 31Y, 31M, 31C, and 31K is maintained within the allowable range.

Therefore, regardless of the temperature difference among the collimator lenses 32Y, 32M, 32C, and 32K, the optical scanning device 26 can control the temperature difference between each of the semiconductor lasers 31Y, 31M, 31C, and 31K and a corresponding one of the collimator lenses 32Y, 32M, 32C, and 32K to fall within the allowable range as designed, such that the defocuses of the collimator lenses 32Y, 32M, 32C, and 32K are suppressed. This maintains excellent optical characteristics of the source-side optical system. Consequently, the color misregistration in the color toner image caused by the optical characteristics of the source-side optical system and unevenness in toner densities between the lines are less likely to occur. Thus, the optical scanning device 26 can further enhance an image quality of the toner image with ease.

[Modifications]

(A) The image forming device 100 in FIG. 1 is a color laser printer. Further, the image forming device according to one or more embodiments of the present invention may be a single function peripheral (SFP) such as a monochrome laser printer, a copier, or a facsimile, or a multifunction peripheral (MFP).

(B) The light source 310 in FIG. 2 includes the semiconductor lasers 31Y, 31M, 31C, and 31K in FIG. 3 as light-emitting elements (light emitters). The light-emitting elements may be current-driven elements employing other methods such as LEDs. One or more embodiments of the present invention are effective as long as a current amount necessary for light emission by light-emitting elements has the lower limit and wavelengths of light emitted from the light-emitting elements have temperature dependence.

(C) The semiconductor lasers 31Y, 31M, 31C, and 31K each have the laser oscillator 361 with one emission point PE and one emission point PS, as exemplified in FIG. 3. Alternatively, the semiconductor lasers each may have two or more emission points. In this case, the optical scanning device can perform scan the photoreceptor drums 25 by light for each two or more lines per deflection cycle of the polygon mirror 321.

(D) The source-side optical system is not limited to the combination of the collimator lens 312, the mirrors 313-317, and the cylindrical lens 318 in FIG. 2, and may be a combination of other optical elements. For example, a collimator lens and a cylindrical lens may be integrated as a single DOE.

Further, instead of providing one source-side optical system for light scanning with respect to all the four photoreceptor drums 25 in FIG. 2, one source-side optical system may be provided with respect to each of the photoreceptor drums 25, or may be provided with respect to every two of the photoreceptor drums 25.

In either case, one or more embodiments of the present invention are effective as long as integrated or shared lenses are provided separately for each of the semiconductor lasers, and differ from one another in amount of temperature rise caused by heat transfer from the polygon motor 322 due to differences in position relative to the polygon mirror 321, the polygon motor 322, and/or the air passage AFL.

(E) The scanning optical system is not limited to the combination of the polygon mirror 321, the fθ lenses 323 and 324, and the steering mirrors 325, 326Y, 326M, 326C, and 326K, and may be a combination of other optical elements. For example, the number of deflecting surfaces of the polygon mirror may be other than an integer of seven, which is the number of the deflecting surfaces of the polygon mirror 321 in FIG. 2. Further, one scanning optical system may be used for light scanning on one or two of the photoreceptor drums 25 in FIG. 2 instead of on all the four photoreceptor drums 25.

(F) No partitions in particular are set between the air passage AFL in FIG. 4A and the scanning optical system such as the fθ lens 323. Moreover, the polygon mirror 321 and the polygon motor 322 may be thermally isolated from the scanning optical system by a wall.

(G) The DOEs having the effect of offsetting defocus caused by temperature variations of the semiconductor lasers 31Y, 31M, 31C, and 31K are not limited to the collimator lenses 32Y, 32M, 32C, and 32K in FIG. 4, and may be each a cylindrical lens or integrated lenses of a collimator lens and a cylindrical lens. In either case, one or more embodiments of the present invention are effective as long as the lenses are arranged in pairs with the semiconductor leasers 31Y, 31M, 31C, and 31K one-on-one and a temperature difference between each of the lenses and the corresponding semiconductor lens widely varies among the lenses.

(H) The temperature monitor 712 measures the actual temperature of the polygon motor 322 via the temperature sensor 400, and then estimates the respective temperatures of the collimator lenses 32Y, 32M, 32C, and 32K using the actual measurement value of the polygon motor 322 and the position of the collimator lenses relative to the polygon mirror 321, the polygon motor 322, and/or the air passage AFL. Alternatively, instead of performing temperature measurement via the temperature sensor 400, the temperature monitor may measure a usage duration of the polygon motor or each of the semiconductor lasers thus to estimate the respective temperatures of the collimator lenses using the position of the collimator lenses relative to the polygon mirror, the polygon motor, and/or the air passage.

The environmental temperature of the printer 100 determines how the temperature distribution having the peak heat level at the position of the polygon motor varies over the respective usage durations of the polygon motor and the semiconductor lasers, in particular how the respective temperatures of the collimator lenses rise over the usage durations. Therefore, how the temperatures rise can be converted into data by experiments or simulations. The temperature monitor may use the data to retrieve the estimated values of the temperatures of the collimator lenses corresponding to the usage durations from the numerical table, or to calculate the estimated values according to the numerical formula.

(I) The temperature difference adjuster 713 assigns a smaller target value for the bias current amount to a semiconductor laser that has a greater temperature difference from a collimator lens corresponding to the semiconductor laser. In fact, strictly speaking, as in FIG. 7B, the smaller the bias current amount at the time point T2 where the supply current ID for the laser oscillator LD starts rising, the later the supply current ID reaches the target level Itg.

Therefore, in the case where a period, which starts when the supply current ID starts rising and ends when the supply ID starts falling, stays constant, a period in which the supply current ID is kept at the target level Itg, that is, an emission duration of the semiconductor laser, is shortened by a rise delay Δt. An excessive rise delay Δt might greatly decrease an emission amount from the semiconductor laser per pulse of the supply current ID to a nonnegligible level and thus cause an excessive unevenness in emission amount among the semiconductor lasers.

This unevenness in emission amount is visualized, among the four photoreceptor drums 25, as unevenness in lower limit (one dot width) of a length according to which a constant toner density can be maintained in the main scanning direction. Thus, the excessive unevenness causes a risk that color toner images might have an inferior image quality such as color misregistration and color unevenness. In order to prevent the unevenness in emission amount, the modulator 812 may elongate a pulse width of the supply current ID the smaller the bias current amount, so that fall of the supply current ID is delayed.

Figure 9A:
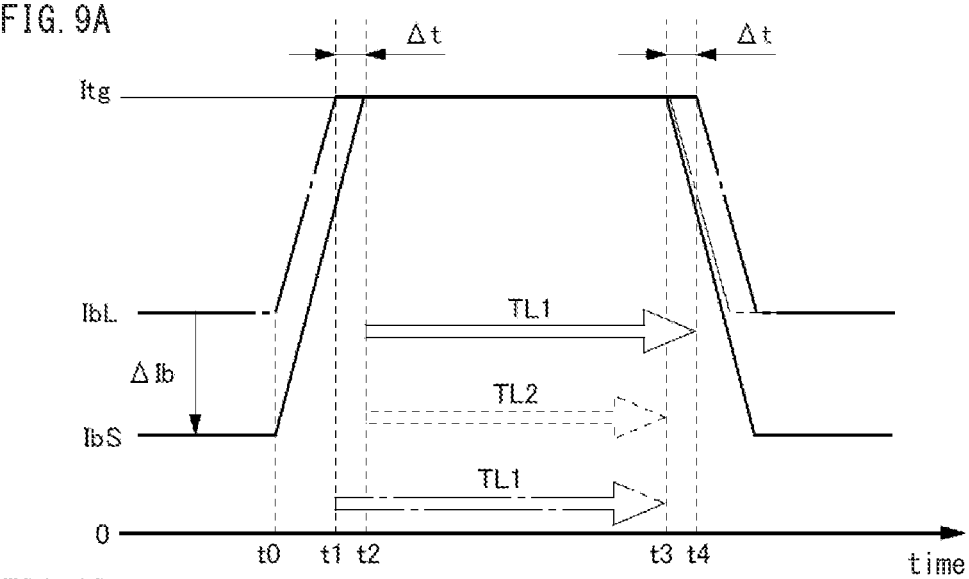
FIG. 9A is an enlarged view of waveform of the supply current ID in the case where the smaller the bias current amount, the later a fall of the supply current ID, according to one or more embodiments.

FIG. 9A is an enlarged view of pulse waveforms of the supply current ID in this case. A waveform of the supply current ID corresponding to a small valuer Ibs of the bias current amount is compared with a waveform of the supply current ID corresponding to a large value IbL of the bias current amount. The respective supply currents ID corresponding to the small value IbS and the large value IbL both start rising from a time point t0. However, while the supply ID corresponding to the large value IbL reaches the target level Itg at a time point t1, the supply ID corresponding to the small value IbS reaches the target level Itg at a time point t2, which is later than the time point t1 by the time difference $\Delta t$.

Hence, if the respective supply currents ID corresponding to the small value IbS and the large value IbL both start falling at a time point t3, a time length during which the supply current ID is kept at the target level Itg, that is, a pulse width TL2 of the supply current ID, is shorter by the rise delay $\Delta t$ than a pulse width TL1 of the supply current ID corresponding to the large value IbL of the bias current amount.

Thus, the modulator 812 extends the pulse width of the supply current ID, which corresponds to the small value Ibs of the bias current amount, by a time length of the rise delay $\Delta t$. This makes the pulse width of the supply current ID, that is, the emission duration, constant among the semiconductor lasers regardless of the unevenness in bias current amount. Therefore, when the target level Itg of the supply current ID is constant among the semiconductor lasers, the emission amount per pulse is accordingly constant among the semiconductor lasers. Thus, the dots constituting toner image have a constant width.

In order to prevent the unevenness in dot width caused by the unevenness in bias current amount among the semiconductor lasers, the bias current amount may be maintained at a constant value among the semiconductor lasers during a period immediately before writing of one line starts in each deflection cycle, in addition to extension or shortening of the pulse width of the supply current ID.

Figure 9B:
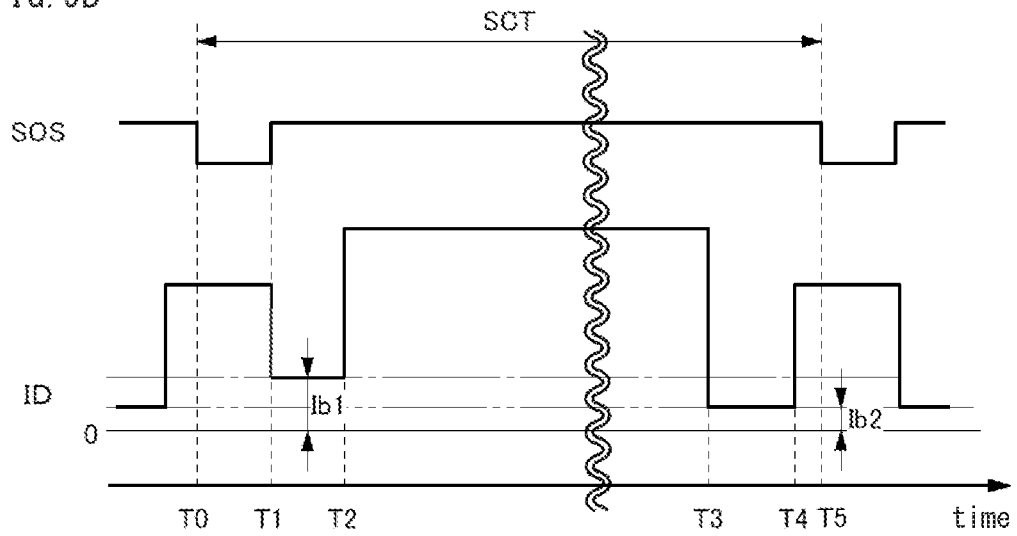
FIG. 9B is a timing chart of the SOS signal and the supply current ID of the semiconductor laser according to one or more embodiments.

FIG. 9B is a timing chart of the SOS signal and the supply current ID of the semiconductor lasers. Similarly to FIG. 7A, the bias current IB is supplied to the semiconductor lasers during periods excluding the light emission periods T0-T1, T2-T3, and T4-T5 in each deflection cycle SCT. That is, the bias current IB is supplied during the following two periods in each of the deflection cycles: a period from the time point T1, where the reflected beam RL reflected by the polygon mirror 321 has totally finished crossing a light receiving surface of the SOS sensor 330, to the time point T2, where the beam reaches the front edge of the one line to be written; and a period from the time point T3, where the condensation point on the photoreceptor drum 25 reaches the rear edge of the line to be written, to the time point T4, which is immediately before return of the deflection angle φ of the laser beam LL by the polygon mirror 321 from the minimum value φL to the maximum value φR.

Writing of the line starts immediately after the first period T1-T2 ends. Accordingly, the bias current amount needs to be kept at a common value Ib1 among the semiconductor lasers during the first period T1-T2 in order to prevent the unevenness in dot width among the semiconductor lasers. When the second period T3-T4 is sufficiently long, the bias current amount Ib2 is differentiated among the semiconductor lenses during this period so that the temperature difference between each of the semiconductor lasers and a corresponding one of the collimator lenses is maintained within the allowable range by using an amount of a temperature rise caused by Joule heat amount generated according to the bias current.

(J) The collimator lenses 32Y, 32M, 32C, and 32K are designed based on a presupposition that no substantial difference exists among the respective semiconductor lasers 31Y, 31M, 31C, and 31K of the Y, M, C, and K colors in patterns of operation temperature variation over the operation duration of the light source 310, particularly based on a presupposition that the semiconductor lasers 31Y, 31M, 31C, and 31K have an equal value of the operation temperature TTL.

However, in practice, a heat source arranged around the semiconductor lasers can sometimes make this presupposition incorrect in precise sense. For example, in the light-emitting substrate 311 in FIG. 2, the driving circuit 31D is positioned at one end in a longitudinal direction of the substrate, and the semiconductor lasers 31Y, 31M, 31C, and 31K arranged along the longitudinal direction on the same substrate are in different distances from the driving circuit 31D.

A large amount of Joule heat is released by the driving circuit 31D during an operation, and this generates a temperature gradient having a peak position at the driving circuit 31D on the light-emitting substrate 311. Thus, difference occurs in ambient temperature among the semiconductor lasers 31Y, 31M, 31C, and 31K according to the distance from the driving circuit 31D.

In the case where this temperature difference is excessive, the above presupposition is not satisfied, which presupposes that no substantial difference exists among the respective semiconductor lasers 31Y, 31M, 31C, and 31K of the Y, M, C, and K colors in variation pattern of operation temperature. In this case, the temperature difference adjuster 713 may perform the following correction on a distribution of the Joule heat amount of the semiconductor lasers 31Y, 31M, 31C, and 31K represented by the bar graph in FIG. 8A.

Figure 9C:
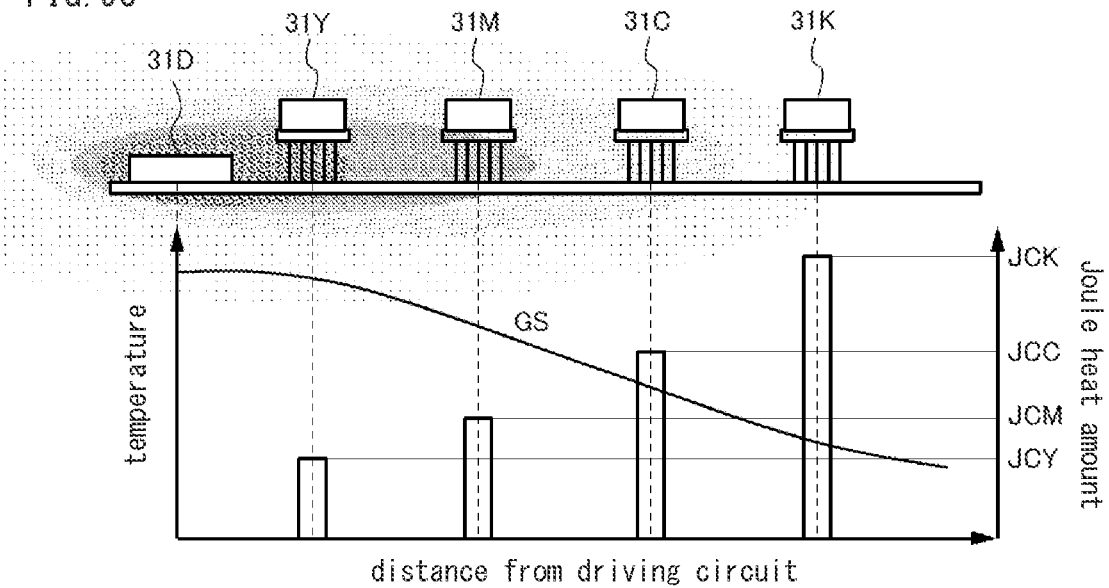
FIG. 9C illustrates a graphic curve GS representing a temperature gradient generated on a light-emitting substrate during an operation of a driving circuit 31D which is arranged at one end of the light-emitting substrate in a longitudinal direction and a bar graph representing a distribution of the Joule heat amounts among the semiconductor lasers which can offset the difference in ambient temperature represented by the graphic curve GS according to one or more embodiments.

FIG. 9C illustrates a graphic curve GS representing a temperature gradient generated on the light-emitting substrate 311 during an operation of the driving circuit 31D which is arranged at the one end of the light-emitting substrate 311 in the longitudinal direction. As the curve GS represents, since the Joule heat transfers from the driving circuit 31D, a closer part on the light-emitting substrate 311 to the driving circuit 31D has a higher ambient temperature (the temperature is higher where the gradation is darker in FIG. 9C).

Such a temperature distribution causes a difference in ambient temperature among implemented portions of the semiconductor lasers 31Y, 31M, 31C, and 31K by several degrees Celsius. In this case, as described below, with respect to each of the semiconductor lasers 31Y, 31M, 31C, and 31K, the temperature difference adjuster 713 corrects the target value for the bias current amount of the semiconductor laser, which corresponds to a higher estimated value of ambient temperature, to a smaller value.

As a result, the difference in ambient temperature is offset by the difference in temperature rise amount due to the Joule heat generated according to the bias current. Thus, the difference in operation temperature among the semiconductor lasers 31Y, 31M, 31C, and 31K is maintained within an allowable range. In other words, the operation temperatures of the semiconductor lasers are considered to coincide with one another within the allowable range.

FIG. 9C further illustrates a bar graph representing a distribution of the Joule heat amounts among the semiconductor lasers 31Y, 31M, 31C, and 31K which can offset the difference in ambient temperature represented by the graphic curve GS. The respective semiconductor lasers 31Y, 31M, 31C, and 31K of the Y, M, C, and K colors are closer to the driving circuit 31D in this order, and accordingly have estimated values of the ambient temperature that are higher in the same order.

Therefore, in order to offset the difference in ambient temperature by the difference in temperature rise amounts caused by the Joule heat, the values JCY, JCM, JCC, and JCK of the Joule heat amount, which respectively correspond to the respective semiconductor lasers 31Y, 31M, 31C, and 31K of the Y, M, C, and K colors, need to be smaller in this order.

The temperature difference adjuster 713 corrects the Joule heat amounts JHY, JHM, JHC, and JHK in FIG. 8A based on the values JCY, JCM, JCC, and JCK of the Joule heat amount, which can offset the difference in ambient temperature, and then sets the respective bias current amounts necessary for the semiconductor lasers 31Y, 31M, 31C, and 31K to generate the corrected Joule heat amounts as the target values IbY, IbM, IbC, and IbK.

The heat source, which cause the difference in ambient temperature among the semiconductor lasers 31Y, 31M, 31C, and 31K, is not limited to the driving circuit 31D mounted on the light-emitting substrate 311. Alternatively, the heat source may be any element that is arranged in the vicinity of the light-emitting substrate 311 and can provide sufficient heat amounts to the semiconductor lasers 31Y, 31M, 31C, and 31K.

Examples of such an element include the polygon mirror 321, the polygon motor 322, the air passage AFL, a fixing device, the motors and their driving circuits for driving the movable members such as the conveyance roller, the CPU of the main controller, and a power supply. It is possible to estimate the difference in ambient temperature among the semiconductor lasers based an amount of heat generated by the heat source and respective distances of the semiconductor lasers from the heat source.

(K) The temperature difference adjuster 713 adjusts the bias current amount of each of the semiconductor lasers 31Y, 31M, 31C, and 31K to adjust the Joule heat amount to be generated according to the bias current, and thus controls the respective operation temperatures of the semiconductor lasers 31Y, 31M, 31C, and 31K. Furthermore, the temperature difference adjuster 713 may adjust the rotation speed of the fan 410 to adjust the respective heat amounts released from the collimator lenses 32Y, 32M, 32C, and 32K, and thus control the temperature difference between each of the collimator lenses 32Y, 32M, 32C, and 32K and a corresponding one of the semiconductor lasers 31Y, 31M, 31C, and 31K.

Specifically, in the case where the fan controller 730 controls the rotation speed of the fan 410 in two stages, namely, half speed and full speed, the temperature difference adjuster 713 makes the fan controller 730 maintain the rotation speed of the fan 410 at the half speed in an initial state. Further, the temperature difference adjuster 713 monitors the temperature difference ΔT between each of the collimator lenses 32Y, 32M, 32C, and 32K and the corresponding semiconductor laser in FIG. 8A based on the temperature of the collimator lens estimated by the temperature monitor 712.

When a minimum value of the temperature difference ΔT falls below the allowable lower limit, the temperature difference adjuster 713 makes the fan controller 730 switch the rotation speed of the fan 410 from the half speed to the full speed. This increases heat amounts released from the collimator lenses 32Y, 32M, 32C, and 32K to the surrounding airflow AFL. As a result, the temperatures of the collimator lenses 32Y, 32M, 32C, and 32K decrease, and thus the temperature difference ΔT between each of the semiconductor lasers and a corresponding one of the collimator lenses is maintained above the allowable lower limit.

In the case where the fan controller 730 is capable of varying the rotation speed of the fan 410 in a continuous manner, the temperature difference adjuster 713 may adjust the rotation speed of the fan 410 according to the temperature difference ΔT between each of the semiconductor lasers and a corresponding one of the collimator lenses.

[Outline]

An optical scanning device according to one or more embodiments of the present invention is an optical scanning device that scans a photoreceptor by light, the optical scanning device comprising: light-emitting elements that each emit a light amount according to a supply current amount; a source-side optical system that includes optical elements corresponding one-to-one to the light-emitting elements, the optical elements each being transmissive to the light emitted from a corresponding one of the light-emitting elements and shaping the light emitted from the corresponding light-emitting element; a polygon mirror that cyclically deflects the light shaped by the source-side optical system; an image-side optical system that condenses the light deflected by the polygon mirror on a surface of the photoreceptor; a motor that rotates the polygon mirror; and a light source controller that controls the supply current amount for each of the light-emitting elements. The light source controller includes: a temperature monitor that monitors respective temperatures of the optical elements, the temperatures varying due to heat transfer from at least one of the polygon mirror, the motor, and an air passage through which an external air flows to release heat from the polygon mirror and the motor; and a temperature difference adjuster that adjusts the supply current amount for each of the light-emitting elements or adjusts the temperature of one of the optical elements corresponding to the light-emitting element, such that a temperature difference between the light-emitting element and the corresponding optical element falls within an allowable range.

Also, according to an optical scanning device of one or more embodiments of the present invention, the light source controller may modulate the supply current amount according to image data during a period in which the light-emitting element should emit light, and control the supply current amount to be a bias current amount below a lower limit current amount necessary for light emission during a period in which the light-emitting element should not emit light. When adjusting the supply current amount, the temperature difference adjuster may adjust the respective bias current amounts of the light-emitting elements, where a light-emitting element having a greater temperature difference from a corresponding one of the optical elements has a smaller adjusted bias current amount.

Also, according to an optical scanning device of one or more embodiments of the present invention, the light-emitting elements may be semiconductor lasers. The temperature adjuster may adjust the bias current amount for each of the semiconductor lasers taking into consideration a threshold current of the semiconductor laser.

Also, according to an optical scanning device of one or more embodiments of the present invention, the light source controller may adjust the bias current amount for each of the light-emitting elements. The temperature adjuster may adjust the bias current amount for each of the light-emitting elements according to the temperature difference from a corresponding one of the optical elements.

Also, according to an optical scanning device of one or more embodiments of the present invention, the light source controller may assign respective emission durations to the light-emitting elements, where a longer emission duration is assigned to a light-emitting element supplied with a smaller bias current amount.

Also, according to an optical scanning device of one or more embodiments of the present invention, the light source controller may supply each of the light-emitting elements with a smaller bias current amount only during part of the period in which the light-emitting element should not emit light.

Also, according to an optical scanning device of one or more embodiments of the present invention, the optical scanning device may further comprise a fan that air-cools the optical elements, or generates an airflow through the air passage to release heat from the polygon mirror and the motor. When adjusting the temperature for each of the optical elements, the temperature difference adjuster may adjust a rotation speed of the fan according to the temperature difference between the optical element and a corresponding one of the light-emitting elements.

Also, according to an optical scanning device of one or more embodiments of the present invention, the temperature difference adjuster may adjust the rotation speed of the fan to be higher according to a smaller temperature difference between the optical element and the corresponding light-emitting element.

Also, according to an optical scanning device of one or more embodiments of the present invention, the optical elements may be diffractive optical elements that each vary in temperature and thus vary in optical characteristics thereby to offset defocus caused by variation in temperature of one of the light-emitting elements corresponding to the diffractive optical element.

Also, according to an optical scanning device of one or more embodiments of the present invention, the optical elements may be collimator lenses.

Also, according to an optical scanning device of one or more embodiments of the present invention, the temperature monitor may measure an actual temperature of at least one of the polygon mirror, the motor, and the air passage, and estimate the temperature of each of the optical elements from the actual temperature measured and a position of the optical element relative to the at least one of the polygon mirror, the motor, and the air passage.

Also, according to an optical scanning device of one or more embodiments of the present invention, the temperature monitor may measure a usage duration of the motor or each of the light-emitting elements, and estimate the temperature of each of the optical elements from the measured usage duration of the motor or one of the light-emitting elements corresponding to the optical element and a position of the optical element relative to at least one of the polygon mirror, the motor, and the air passage.

Also, according to an optical scanning device of one or more embodiments of the present invention, the temperature difference adjuster may estimate a temperature difference among the light-emitting elements from arrangement of a heat source around the light-emitting elements.

Also, according to an optical scanning device of one or more embodiments of the present invention, the heat source may include a drive circuit for the light-emitting elements, and the temperature difference adjuster may estimate respective operation temperatures of the light-emitting elements, where a closer light-emitting element to the driving circuit has a higher estimated operation temperature.

An image forming device of one or more embodiments of the present invention is an image forming device that forms a toner image on a sheet, the image forming device comprising: a photoreceptor that varies in electrical charge amount according to an exposure amount; an optical scanning device that scans the photoreceptor by light to form an electrostatic latent image on the photoreceptor: a developer that develops the electrostatic latent image by a toner to form a toner image; and a transfer unit that transfers the toner image from the photoreceptor onto a sheet. The optical scanning device comprises: light-emitting elements that each emit a light amount according to a supply current amount; a source-side optical system that includes optical elements corresponding one-to-one to the light-emitting elements, the optical elements each being transmissive to the light emitted from a corresponding one of the light-emitting elements and shaping the light emitted from the corresponding light-emitting element; a polygon mirror that cyclically deflects the light shaped by the source-side optical system; an image-side optical system that condenses the light deflected by the polygon mirror on a surface of the photoreceptor; a motor that rotates the polygon mirror; and a light source controller that controls the supply current amount for each of the light-emitting elements. The light source controller includes: a temperature monitor that monitors respective temperatures of the optical elements, the temperatures varying due to heat transfer from at least one of the polygon mirror, the motor, and an air passage through which an external air flows to release heat from the polygon mirror and the motor; and a temperature difference adjuster that adjusts the supply current amount for each of the light-emitting elements or adjusts the temperature of one of the optical elements corresponding to the light-emitting element, such that a temperature difference between the light-emitting element and the corresponding optical element falls within an allowable range.

With the above structure, the optical scanning device monitors a temperature rise of each of the optical elements included in the source-side optical system due to heat transfer from the polygon mirror, the polygon motor, and/or the air passage, and adjusts the temperature of the optical element or adjusts the supply current amount of one of the light-emitting elements corresponding to the optical element according to the temperature difference between the optical element and the corresponding light-emitting element. This allows the optical scanning device to maintain excellent optical characteristics of the source-side optical system for all of the light-emitting elements regardless of the temperature difference among the optical elements included in the source-side optical system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical scanning device that scans a photoreceptor with light, the optical scanning device comprising:
    a light emitter that emits light according to a supply current amount;

a source-side optical system that includes an optical element corresponding to the light emitter, wherein the optical element transmits and shapes the light emitted from the corresponding light emitter;

a polygon mirror that cyclically deflects the light shaped by the source-side optical system;

an image-side optical system that condenses the light deflected by the polygon mirror on a surface of the photoreceptor;

a motor that rotates the polygon mirror; and a light source controller that:
controls the supply current amount for the light emitter;
monitors a temperature of the optical element that varies according to heat transfer from at least one of the polygon mirror, the motor, and an air passage through which external air flows to release heat from the polygon mirror and the motor; and
adjusts the supply current amount for the light emitter or adjusts the temperature of the optical element corresponding to the light emitter such that a temperature difference between the light emitter and the corresponding optical element falls within an allowable range, wherein the light source controller modulates the supply current amount according to image data during a period in which the light emitter emits light, and controls the supply current amount to be a bias current amount below a lower limit current amount necessary for light emission during a period in which the light emitter does not emit light.

2. The optical scanning device according to claim 1, wherein
when adjusting the supply current amount, the light source controller adjusts the bias current amount of the light emitter such that the light emitter having a greater temperature difference from the corresponding optical element has a smaller adjusted bias current amount.

3. The optical scanning device according to claim 2, wherein
the light emitter is a semiconductor laser, and
the light source controller adjusts the bias current amount for the semiconductor laser according to a threshold current of the semiconductor laser.

4. The optical scanning device according to claim 2, wherein
the light source controller adjusts the bias current amount for the light emitter according to the temperature difference from the corresponding optical element.

5. The optical scanning device according to claim 2, wherein
the light source controller assigns a longer emission duration to the light emitter supplied with a smaller bias current amount.

6. The optical scanning device according to claim 5, wherein
the light source controller supplies the light emitter with a smaller bias current amount during only part of the period in which the light emitter does not emit light.

7. The optical scanning device according to claim 1, further comprising:
a fan that air-cools the optical element or generates an airflow through the air passage to release the heat from the polygon mirror and the motor, wherein
when adjusting the temperature for the optical element, the light source controller adjusts a rotation speed of the fan according to the temperature difference between the optical element and the corresponding light emitter.

8. The optical scanning device according to claim 7, wherein
the light source controller adjusts the rotation speed of the fan to be higher according to a smaller temperature difference between the optical element and the corresponding light emitter.

9. The optical scanning device according to claim 1, wherein
the optical element is a diffractive optical element that varies in optical characteristics with temperature variation and offsets defocus caused by variation in temperature of the light emitter corresponding to the diffractive optical element.

10. The optical scanning device according to claim 1, wherein
the optical element is a collimator lens.

11. The optical scanning device according to claim 1, wherein
the light source controller measures an actual temperature of at least one of the polygon mirror, the motor, and the air passage, and estimates the temperature of the optical element from the measured actual temperature and a position of the optical element relative to the at least one of the polygon mirror, the motor, and the air passage.

12. The optical scanning device according to claim 1, wherein
the light source controller measures a usage duration of the motor or the light emitter, and estimates the temperature of the optical element from the measured usage duration of the motor or the light emitter corresponding to the optical element and a position of the optical element relative to at least one of the polygon mirror, the motor, and the air passage.

13. The optical scanning device according to claim 1, wherein
the light source controller estimates a temperature difference among a plurality of light emitters from arrangement of a heat source around the light emitters.

14. The optical scanning device according to claim 13, wherein
the heat source includes a drive circuit for the light emitters, and
the light source controller estimates respective operation temperatures of the light emitters to make a closer light emitter to the driving circuit, among the light emitters, have a higher estimated operation temperature.

15. An image forming device that forms a toner image on a sheet, the image forming device comprising:
a photoreceptor that varies in electrical charge amount according to an exposure amount;
an optical scanning device that scans the photoreceptor with light to form an electrostatic latent image on the photoreceptor:
a developer that develops the electrostatic latent image with a toner to form a toner image; and
a transfer unit that transfers the toner image from the photoreceptor onto a sheet, wherein
the optical scanning device comprises:
a light emitter that emits light according to a supply current amount;
a source-side optical system that includes an optical element corresponding to the light emitter, wherein the optical element transmits and shapes the light emitted from the corresponding light emitter;
a polygon mirror that cyclically deflects the light shaped by the source-side optical system;

an image-side optical system that condenses the light deflected by the polygon mirror on a surface of the photoreceptor;
a motor that rotates the polygon mirror; and
a light source controller that:
  controls the supply current amount for the light emitter;
  monitors a temperature of the optical element that varies according to heat transfer from at least one of the polygon mirror, the motor, and an air passage through which an external air flows to release heat from the polygon mirror and the motor; and
  adjusts the supply current amount for the light emitter or adjusts the temperature of the optical element corresponding to the light emitter such that a temperature difference between the light emitter and the corresponding optical element fall within an allowable range, and
the light source controller modulates the supply current amount according to image data during a period in which the light emitter emits light, and controls the supply current amount to be a bias current amount below a lower limit current amount necessary for light emission during a period in which the light emitter does not emit light.

* * * * *